(12) United States Patent
Hewlett et al.

(10) Patent No.: US 7,230,752 B2
(45) Date of Patent: Jun. 12, 2007

(54) ELECTRONICALLY CONTROLLED STAGE LIGHTING SYSTEM

(75) Inventors: William Hewlett, Sutton Coldfield (GB); Ian Clarke, Walsall (GB); Nigel Evans, West Midlands (GB); Richard Parker, Birmingham (GB); Mark A. Hunt, Derby (GB); Michael Hughes, Wolverhampton (GB)

(73) Assignee: Production Resource Group, L.L.C., New Windsor, NY (US)

( * ) Notice: Subject to any disclaimer, the term of this patent is extended or adjusted under 35 U.S.C. 154(b) by 8 days.

(21) Appl. No.: 10/775,721

(22) Filed: Feb. 9, 2004

(65) Prior Publication Data

US 2004/0160198 A1 Aug. 19, 2004

Related U.S. Application Data

(60) Continuation of application No. 09/885,590, filed on Jun. 19, 2001, now Pat. No. 6,736,528, which is a continuation of application No. 09/577,428, filed on May 22, 2000, now Pat. No. 6,622,053, which is a division of application No. 08/854,353, filed on May 12, 1997, now Pat. No. 6,188,933.

(51) Int. Cl.
*G02B 26/08* (2006.01)
*G02B 26/00* (2006.01)
*G02F 1/29* (2006.01)

(52) U.S. Cl. ............... 359/298; 359/290; 359/291; 359/154; 359/158

(58) Field of Classification Search ......... 359/298, 359/290, 291, 115, 123, 135, 154, 158; 385/84; 353/84, 87, 101, 122
See application file for complete search history.

(56) References Cited

U.S. PATENT DOCUMENTS

| 3,958,116 | A | | 5/1976 | Jones |
| 4,015,115 | A | * | 3/1977 | Corcoran ............... 398/79 |
| 4,392,187 | A | | 7/1983 | Bornhorst |
| 4,947,302 | A | | 8/1990 | Callahan |
| 5,010,459 | A | | 4/1991 | Taylor et al. |
| 5,045,983 | A | | 9/1991 | Shields et al. |
| 5,061,049 | A | | 10/1991 | Hornbeck |
| 5,231,388 | A | | 7/1993 | Stoltz |

(Continued)

FOREIGN PATENT DOCUMENTS

| EP | 0662773 A | 7/1995 |
| JP | 04136979 | 5/1992 |
| WO | WO96/30805 | 10/1996 |
| WO | WO 98/52386 | 11/1998 |

OTHER PUBLICATIONS

PRODUCT REVIEW, Texas Instruments, DSP Controllers, High-Performance Static CMOS Technology, SPRS042; Oct. 1996 (Figs. 1-28, only).

(Continued)

*Primary Examiner*—Hung X. Dang
*Assistant Examiner*—Brandi N. Thomas
(74) *Attorney, Agent, or Firm*—Fish & Richardson P.C.

(57) ABSTRACT

A lighting system operating using a digital mirror as its operative device. The digital mirror is used to shape the light which is a passed through advanced optical devices in order to produce an output.

46 Claims, 23 Drawing Sheets

U.S. PATENT DOCUMENTS

| | | |
|---|---|---|
| 5,406,176 A | 4/1995 | Sugden |
| 5,414,328 A | 5/1995 | Hunt et al. |
| 5,426,576 A | 6/1995 | Hewlett |
| 5,467,146 A | 11/1995 | Huang et al. |
| 5,502,627 A | 3/1996 | Hunt et al. |
| 5,537,303 A | 7/1996 | Stacy |
| 5,668,537 A | 9/1997 | Chansky et al. |
| 5,828,485 A | 10/1998 | Hewlett |
| 5,905,545 A * | 5/1999 | Poradish et al. ............ 348/743 |
| 5,921,659 A | 7/1999 | Hunt et al. |
| 5,940,204 A | 8/1999 | Hewlett |
| 5,953,151 A | 9/1999 | Hewlett |
| 5,953,152 A | 9/1999 | Hewlett |
| 5,969,485 A | 10/1999 | Hunt |
| 6,011,662 A | 1/2000 | Evans |
| 6,126,288 A | 10/2000 | Hewlett |
| 6,188,933 B1 | 2/2001 | Hewlett |
| 6,622,053 B1 | 9/2003 | Hewlett et al. |
| 6,736,528 B2 | 5/2004 | Hewlett et al. |

OTHER PUBLICATIONS

English language abstract of Japanese Patent Application JP 04136979, published May 11, 1992, entitled: "Projection Type Display Device".

* cited by examiner

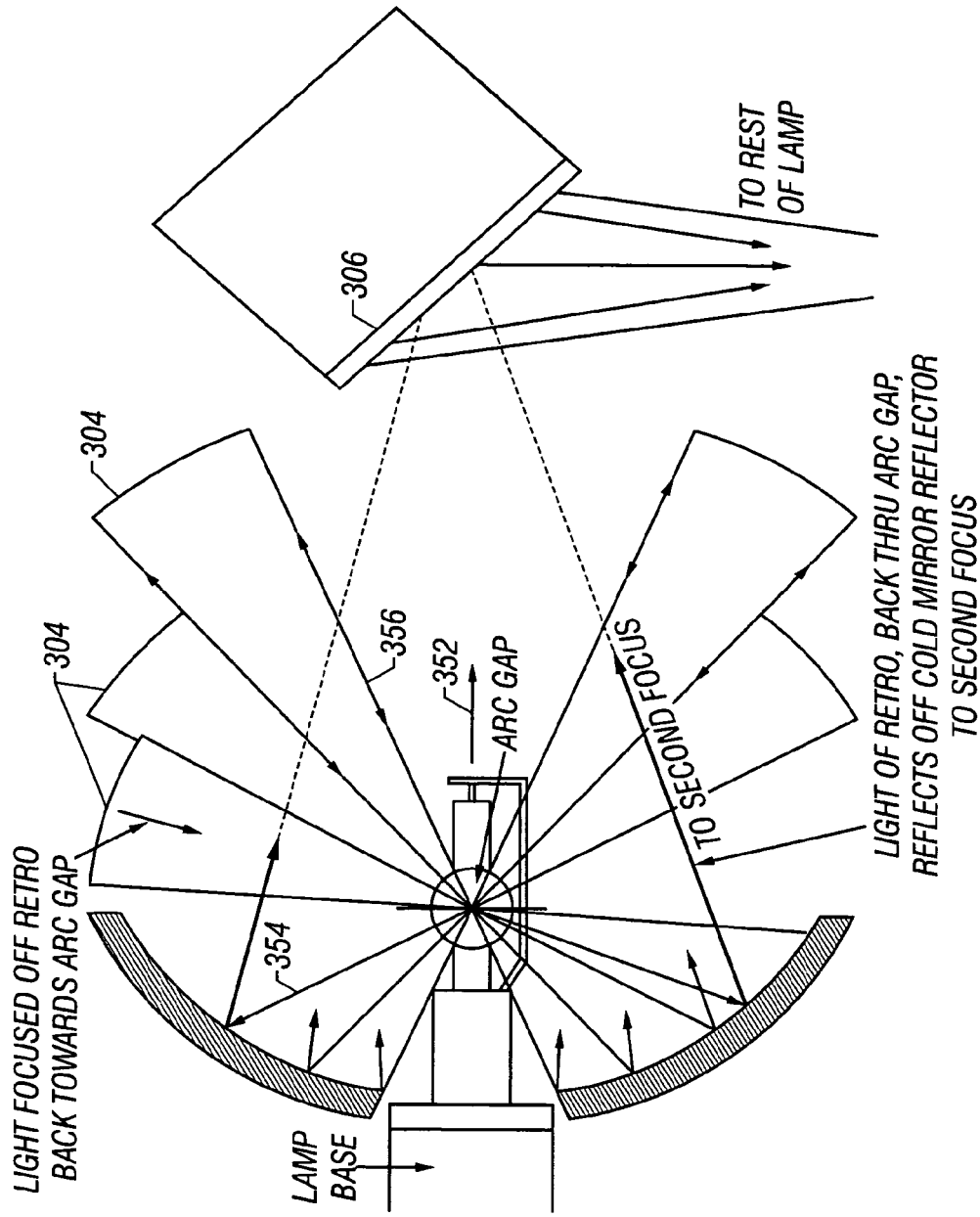

ELECTRONICALLY CONTROLLED STAGE LIGHTING SYSTEM

CROSS-REFERENCD TO RELATED APPLICATIONS

This application is a continuation (and claims the benefit of priority under 35 USC 120) of U.S. application Ser. No. 09/885,590, filed Jun. 19, 2001 now U.S. Pat. No. 6,736,528, which is a continuation of U.S. application Ser. no. 09/577,428, filed May 22, 2000, now U.S. Pat. No. 6,622,053, which is a divisional of U.S. application Ser. No. 08/854,353, filed May 12, 1997, now U.S. Pat. No. 6,188,933. The disclosures of the prior applications are considered part of (and are incorporated by reference in) the disclosure of this application.

FIELD

The present disclosure relates to an electronically controlled stage lighting system. More specifically, the present invention describes a digital stage lighting system operating using a digital mirror array as part of its beam forming equipment.

BACKGROUND

Stage lighting systems have increased greatly in complexity in recent years. The current generation of stage lighting equipment uses highly sophisticated computer based control to allow a myriad display of programmable and controllable special effects.

One of the more sophisticated devices is the ICON™ device manufactured by LIGHT & SOUND DESIGN™. The ICON™ includes an extremely sophisticated console from which the countless special effects can be commanded. The console provides commands to each of the lamps in the system. These commands select various functions at specific times which are preset during the planning of an event.

The ICON™ units are moving lights which can be controlled to move in at least two directions: pan and tilt. Some applications may allow the lights to move in a third direction as well. These lights are also remotely controllable and programmable to allow for different lighting effects, including color, color fade, split color, "gobo" (shape of a pattern being displayed), iris, focus and others.

Moving lights such as the ICON™ are among the most sophisticated units in use today. However, less sophisticated, but still highly complicated and computer controlled units also exist. An example is the WASHLIGHT™, available from LIGHT & SOUND DESIGN™. These computer controlled devices allow a limited set of effects, but at a reduced cost.

All of these devices require consideration of complicated trade offs between various factors which influence the final feature set. The lights need to be small in size, quiet and rugged, to accommodate the need for easy set up, transportation, and use. They need to be relatively inexpensive to allow many lights to be used in a show.

Even though small, the lights must be capable of outputting large amounts of light in order to illuminate the desired scene properly. A typical minimum light output is around 5000 lumens. The residual heat from such a lighting operation must be effectively dissipated to avoid damage to the control systems.

The difficult working environment requires careful monitoring and servicing of the components. However, the market continues to demand even more features, which will lead to even further complexity and further demands on the system.

The inventors of the present invention have recognized a number of issues which plague many of these lights. A first issue regards the flexibility. Previous lights have been digitally controlled, in the sense that the control occurs from and via the main console, which is typically a computer. However, many operations use only a preset number of effects. For example, the "gobo", which is the device that is used to shape the light being passed, is typically a discretely-selectable device. One or more of the gobos can be used at any time; however there has been no way to select a gobo function other than the preselected gobo shapes. Similarly, the colors were often selected from a color wheel which allows only discrete colors.

Another problem is maintenance. The lights are transported and operated by "roadies", road-trained technicians whose main objective is to service the lights. The important issue in road shows is proper operation. Therefore, the often emergency nature of such servicing results in many of these service operations to be done by whatever means are necessary, with minimal documentation of the maintenance that was performed. This results in incomplete information about the servicing.

Moreover, the artists are often interested in new effects. Each new effect adds further complexity to the system and control.

Yet another problem is that the luminaires must operate reliably. However, as described above, use of a digital light shape altering device is carried out with large calculation loads. It is necessary to maintain reliable operation in such a situation. These objectives and many others are addressed by the present invention as described herein.

SUMMARY OF THE INVENTION

A number of aspects are described according to the present invention and the following summary summarizes many of these aspects.

A first aspect of the invention is to enable a digital control of many aspects of the light beam. This uses a digital mirror device and configuration as described in our co-pending U.S. patent application Ser. No. 08/598,077, the disclosure of which is incorporated by reference herewith. The techniques described in this application describe not only the use of the digital mirror, but also the techniques which have been found by the inventors to enable its operation in the desired way.

Another aspect of the invention is the provision of automated systems for determining maintenance information. These automated systems allow automatic logging of events that have been done to the lamp.

Another aspect of the invention uses three different coloring techniques, including a custom color wheel, a continuous color cross fader and an RGB wheel to allow different coloring options.

Yet another aspect of the invention involves special electronics which enable this new and sophisticated system to be used in a way that emulates the previous systems.

Yet another aspect of the invention is the redundancy of this system. According to this aspect, special architecture is used to distribute the processing in a way that maximizes the available capability of operations, but yet minimizes the possibility of a misoperation or failure.

Yet another aspect is the description of an advanced cooling system which allows the complicated electronics to be isolated from the heat source in a new way.

Other features of this system include the following:

An improved optical path and cooling of the components in the optical path.

A special lens system which allows better determination of the scene on the stage being imaged.

A balancing element for the moving optics so that any moving optics do not upset the balance of the luminaire.

A remoted element for the digital mirror so that the digital mirror can be properly located relative to the optical system, independent of the placement of the control for the digital mirror.

A special technician port which allows monitoring of status and control of individual lamps.

Special systems allowing control of color changing and cross fading.

A modular architecture with each board in the system including its own digital signal processor.

A special calibration system for the structure on each subsystem that maintains the hardware of the subsystem married to the control on the subsystem to allow more accurate control.

Use of up to three color changing elements: a first color changing element at an out of focus position, a second color changing element at an in focus position and an RGB wheel also at an out of focus position.

Use of cold mirrors to minimize heat transfer to the digital mirror.

Use of the digital hardware to emulate previous generations, including emulation of a hardware gobo.

Special cooling system including a wall of air which is used both as a heat barrier and as a source of cool air.

Special techniques for optimized use of the digital mirror.

A special motor control bus and details of its architecture.

A supervisor automatically maintaining a registry of parts which are changed, and important system events, such as lamp life, overtemperatures, and other things.

BRIEF DESCRIPTION OF THE DRAWING

All of these aspects, and others, will be described in detail herein with reference to the accompanying drawings wherein

FIG. 3A shows a detail of the retroreflector;

DESCRIPTION OF THE PREFERRED EMBODIMENTS

Figure 1:
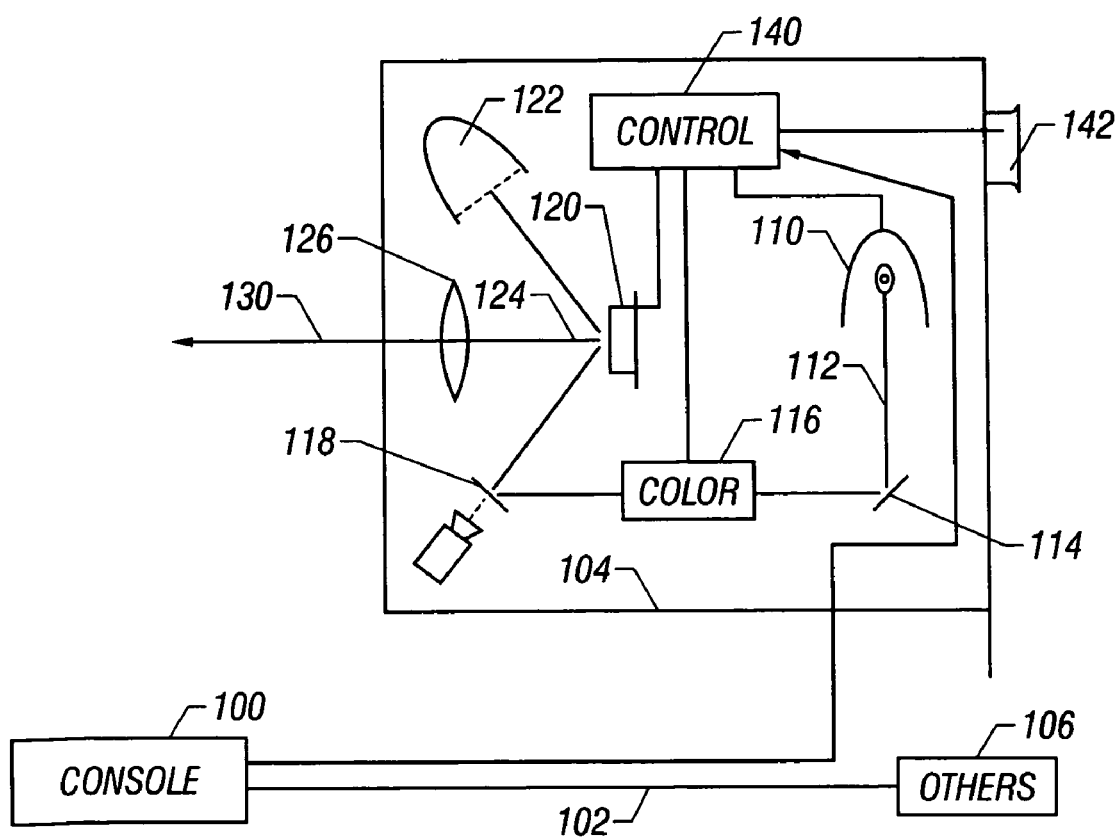
FIG. 1 shows a block diagram of the Medusa system.

FIG. 1 shows a basic block diagram of the system of the present invention, titled the "Medusa". All operations of the system are controlled by console 100. Console 100 may be an ICON™ console which produces commands for lighting systems as well known in the art. Console 100 produces serial lighting control data over line 102. The data is transmitted to the stage lighting unit lumaire 104 as well as to other lumaires shown as 106. There can be any number of such other lighting fixtures 106, however it is most likely that the number if such lighting fixtures be between 10 and 400. An alternative embodiment uses a DMX based control system.

Each lighting fixture 104 includes a self-contained processing unit, including electronic, optical, cooling and mechanical subsystems as described herein.

The optical subsystem carries out the primary function of producing the optical light output in a desired form. This includes the lenses and other optical elements to form the optical output. The optical subsystem is shown and described with reference to FIG. 3.

The mechanical subsystem controls movement of various elements as part of the system. This includes, for example, pan and tilt movement of the lamp beam, beam size, color and other similar parameters. The mechanical subsystem is effected by the subassemblies shown in FIG. 4. Each of these units includes a digital signal processor ("DSP"), a motor, and a connection to a driven element or the driven element itself.

Figure 2:
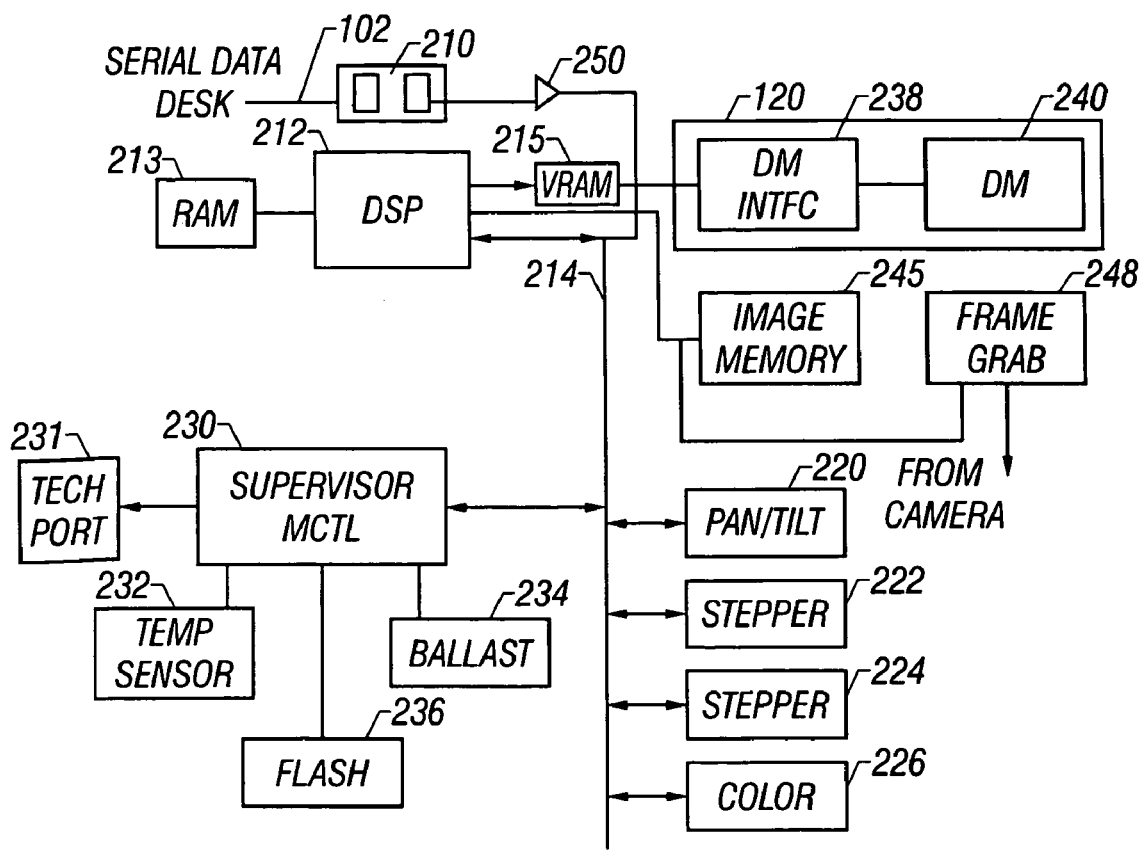
FIG. 2 shows a block diagram of the electronic control subsystem.

The electronic subsystem shown in FIG. 2 carries out control of the overall lamp unit, including receipt of commands from the console portions, monitoring and fault functions, and other electronically controlled elements.

Figure 8:
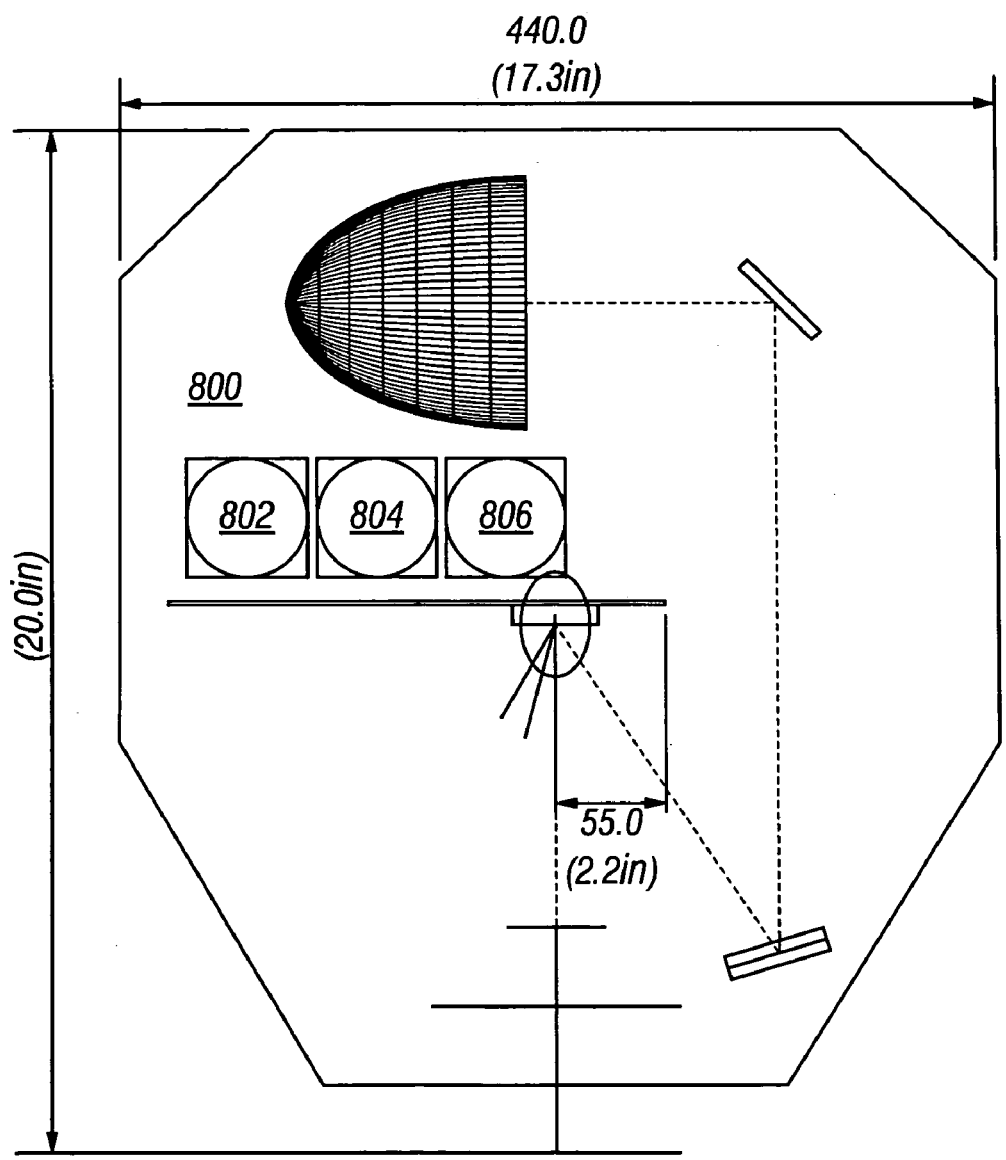
FIGS. 8 and 9 are diagrams of the cooling system of the present system.
Figure 9:
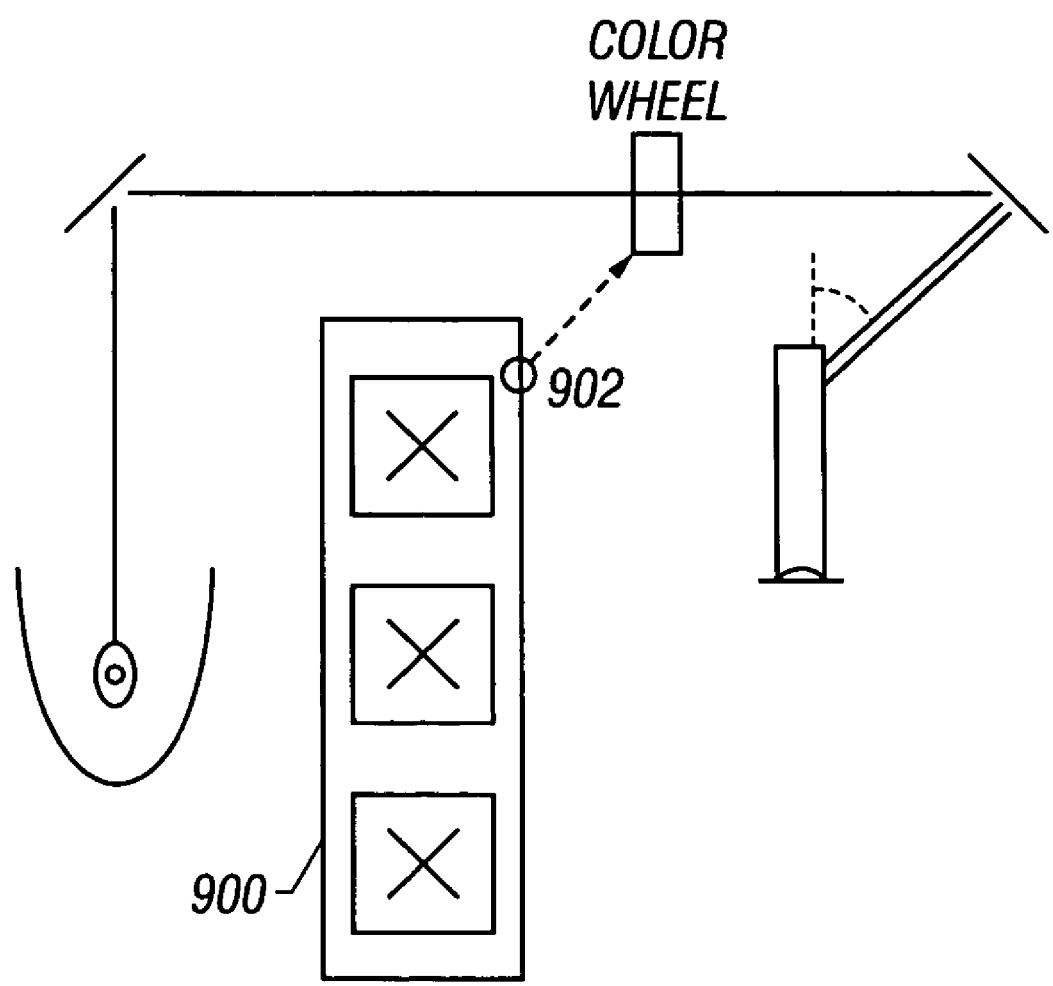

The cooling subsystem shown in FIGS. 8 and 9 maintains the proper temperature of the unit and especially the heat sensitive portions of the unit.

The lamp 104 as shown includes an optical system formed of an illuminating lamp 110 providing light to an optical pathway 112. The optical pathway 112 includes the light beam from light source 110. Light is reflected by a cold mirror assembly including cold mirrors 114 and 118. Color changing mechanism 116 is located in the fold between the cold mirrors 114 and 118. The light is colored by color changing mechanism 116, and is then passed to another cold mirror 118. The reflected light is coupled to a light shape altering device which alters the shape of the light beam. That device is preferably a digital mirror 120 of the type available from Texas Instruments. The digital mirror is described, for example, in U.S. Pat. No. 5,061,049, the disclosure of which is herewith incorporated by reference to the extent necessary for understanding of the present invention. Use of the digital mirror is also described in our co-pending U.S. patent application Ser. No. 08/598,077.

In sum, the digital mirror is formed of an array of pixels, each of which represents a portion of light that can be selectively passed to the target or reflected away in some other direction. The portions of the light are passed to different areas: first area 122 which includes a light sink to absorb the unwanted part of the light, and a second, desired area 124 which is the location for the desired light. The desired light is collected by focusing optics 126 and directed towards target 130, usually the stage.

The optical system is controlled by the controlling structure 140. Controlling structure 140 receives the serial command stream from the console command line 102. Other commands can alternately be input via a technician ("tech") command port 142.

FIG. 2 shows a more detailed diagram of the electronics subsystem. Serial data from the console is received into a dual port serial controller device 210. The serial data is input directly to the master digital signal processor ("DSP") 212, which is preferably a Texas Instruments multimedia video processor ("MVP") model number TMS320C80. Master DSP 212 uses SCC 210 to provide a serial port output which is converted to RS-485 protocol by bus driver 250. This forms a motor control bus 214 which controls all of the motor subsystems 220–226 within the lamp.

Figure 13:
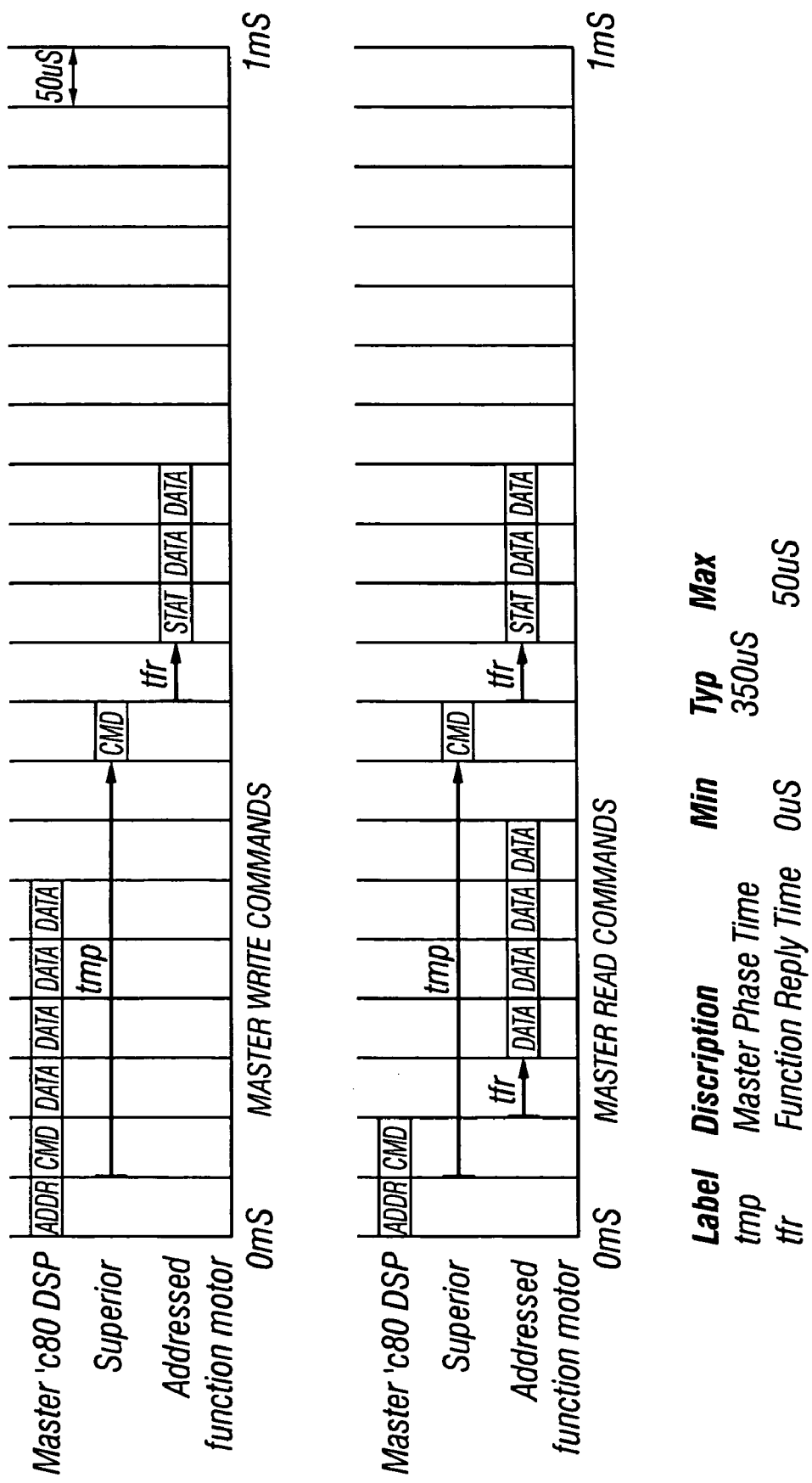
FIGS. 13–15 show timing charts which show the timing of operations on the motor control bus.
Figure 14:
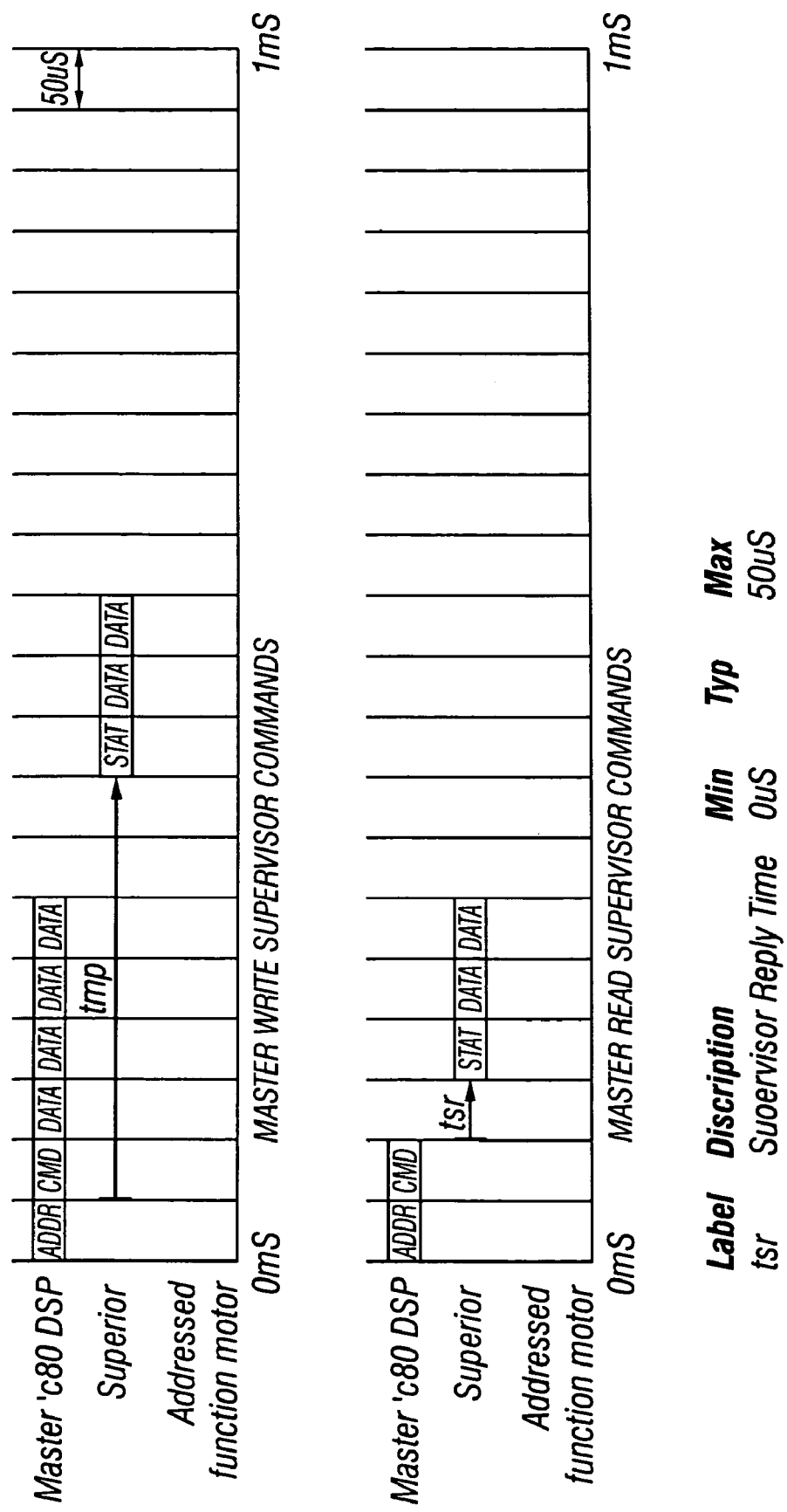
Figure 15:
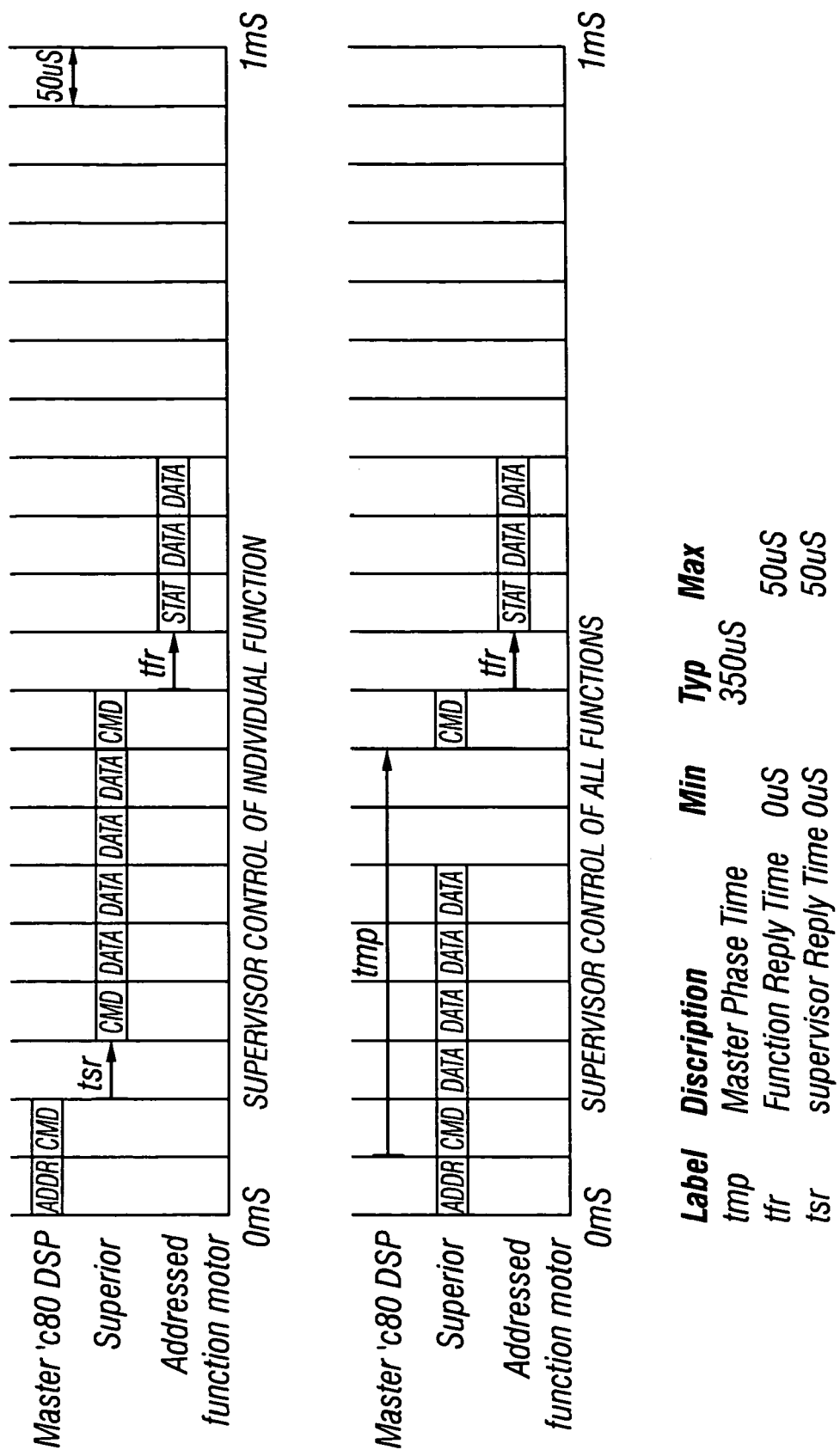

The motor control bus is preferably an RS485 bus which controls and communicates with each of the motor subsystems as described herein with reference to FIGS. 13–15.

Each of the motor control subsystems 220, 222, 224 and 226 is a separated unit including all of the hardware necessary to control its associated motor and other hardware according to applied commands. The motor control subsystem includes a dedicated control structure. For example, a pan/tilt motor subsystem includes all controlling structure for the motor, and the motor itself. This combination allows a modular operation, precise matching between components, and more accurate calibration.

Each motor controller carries out various functions in the lamp. Color changing controller is a motor control structure which carries out operations to move the appropriate motors to drive the color changer for the light. Other stepper motors 222 and 224 are provided to control the movement of movable motor devices, for example, pan and tilt motors. The color motor control system 226 controls a motor to move the color changing element into and out of the path of the light beam.

Master DSP 212 has primary responsibility for controlling operations of the lamp including control of the digital mirror. This latter operation requires computation of complex operations to provide control information for the digital mirror. At times, these calculations leave little time for the master to do much else.

A separate supervisor system 230 has primary responsibility for monitoring status of the lamp and making decisions based on that status. Supervisor 230 is also connected to the motor control bus. Supervisor 230 is preferably a microcontroller as described herein. The microcontroller monitors status of the subsystems including the master. The microcontroller can also control the motor control bus when the determined status makes that appear it becomes desirable or necessary.

Unlike digital signal processor 212, however, the microcontroller is a very technically simple device, adapted for watching the bus and other devices, and monitoring for errors. The microcontroller carries out minimal number crunching; its primary function is to protect and diagnose faults. The supervisor also controls various other functions in the system.

The supervisor 230 monitors the output of temperature sensors 232 to monitor and control various temperatures within the system. Supervisor 230 is also connected to ballast 234 to monitor the condition and operation of the ballast. Finally, supervisor 230 receives possible program parameters from flash memory unit 236.

Light shape altering device 120 is shown as including a digital mirror interface 238 connected to a digital mirror device 240.

The operation of the digital mirror is controlled by master DSP 212 to form any light shape which can be described as a plurality of pixels. A library of possible shapes is stored in image memory 245. These shapes are predefined. Other shapes can be dynamically obtained by frame grabber 248. The frame grabber 248 preferably receives information from a video source or some digital source, and converts those shapes to a form that can be used to alter the shape of the projected light beam.

Two different embodiments of the electronics will be described herein. A first embodiment uses the basic structure shown in FIG. 2. The main CPU and DSP function are the same—the Texas Instrument MVP DSP, which is programmable to carry out many different desired functions. Of course, other processors could be used for this function, including but not limited to the Motorola 68000, a processor from the Intel X86 series, or any other programmable CPU.

Dual port serial communication controller 210 receives serial data 102 from the console. The DSP master 212 also uses an associated working RAM 213 which stores the data.

The output of DSP 212 is driven by driver 250 to form the motor control bus 214 ("MCB") via the serial communication controller ("SCC") 210. SCC includes two UARTs; one of which handles incoming communication from the console, and the other of which produces a serial output stream. That output stream forms a motor control bus ("MCB"). Bus driver 250 produces an RS-485 output in the MCB protocol which is described with reference to FIGS. 13–15.

SCC also provides information to the DSP 212, which receives the information from the console, translates the information, and appropriately outputs the information.

The serial communications device 210 can also be a dual port RAM with a mailbox. In this case, the information is set into the ram, and is flagged. The DSP 212 monitors for new data by investigating the flag to determine whether the flag is set. Whenever the flag is set, DSP 212 retrieves the new information from the RAM and appropriately processes it.

Figure 11:
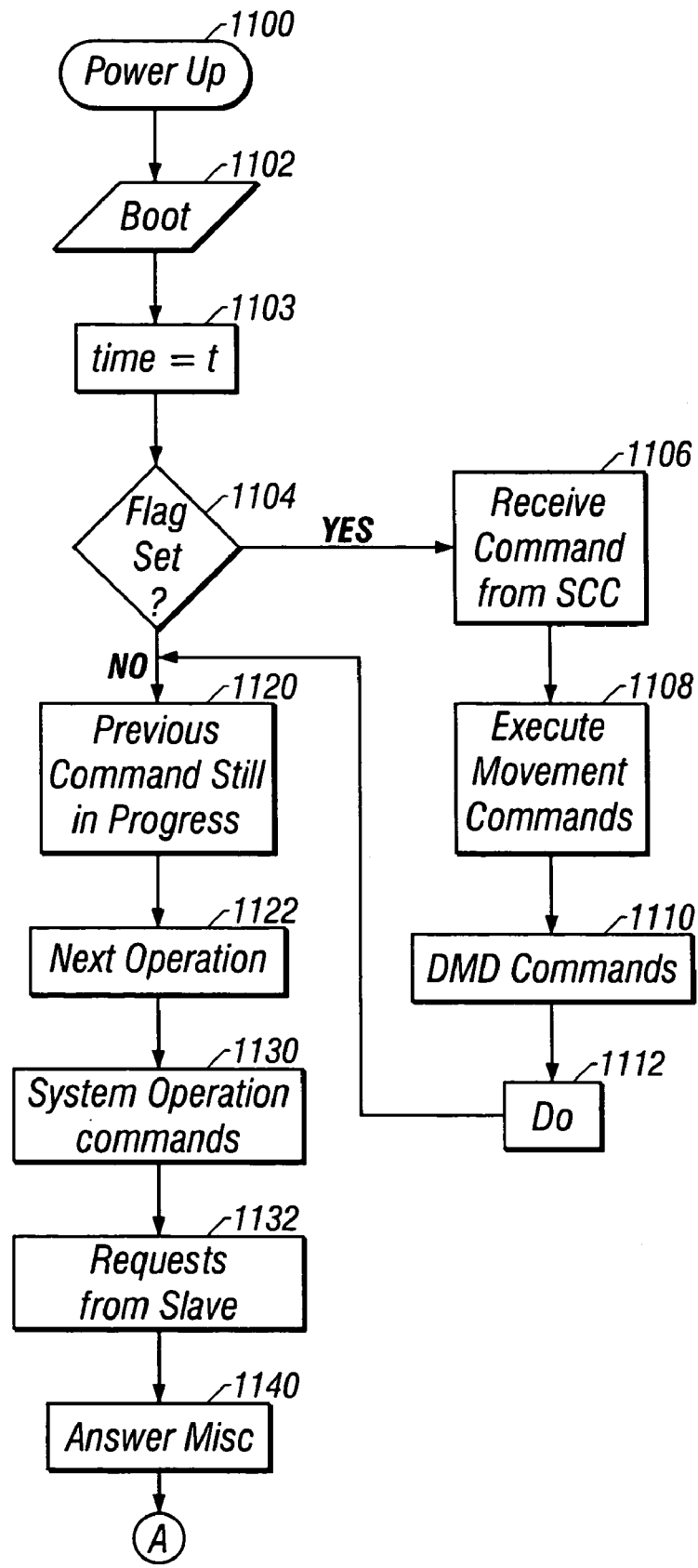
FIG. 11 shows a flowchart of the operation of the master processing device.

The master operations are shown in further detail in the flowchart of FIG. 11. The flowchart is shown depicted instances of operations, each of which are preferably interrupt driven. However, the instances could also be sequential based on a loop operation, or driven by flag operation.

On initial power up at step 1100, the master is booted at step 1102. This boot operation causes the program which is to be run by the master to be transferred from flash memory into the master working RAM. This begins a new routine with entry of the current time t at step 1103.

A new image/operation occurs at every interval of the refresh rate, preferably every ¹⁄₆₀ second. The time t is used to determine when this time has elapsed. The master checks the flag in SCC 210 at step 1104, to determine if any commands have been sent from the console indicating communication with that lamp. If so, the command is received at step 1106, and investigated to determine its contents.

Many of the commands will be lamp move/color change commands, which are similar to those commands that are executed in the prior art. Element 1108 generically calls these movement commands, covering the non-DMD authorizing commands. Those commands are translated by the master DSP 212 into information indicative of commands that are sent to the slave processing boards 220–226 over the motor control bus 214. These commands include color change by cross fader, color change by dichroic color wheel, and color change by RGB wheel, lamp move commands which can be parsed as move to position x, y, and begin either now or at time z and be there at time t, and others. These commands are translated and placed on the motor control bus 214 to appropriately control the associated motors. Those commands are complete when sent—the DSP in the slave motor control subassembly processes the function.

Step 1110 shows digital mirror device controlling commands. These commands include gobo shape, which shapes the light beam according to a predefined shape, and grab shape which shapes the light beam according to an acquired shape, which can be a shape which is downloaded to the lamp or an image acquired from a video source. A frame grabber, which feeds into the DSP, can also be used in order to form a dynamically-changing spotlight shape which follows the shape of the performer on the stage, and hence forms a shadowless follow spot.

Another DMD shape is iris, which corresponds to a superimposition of two different shapes. The iris effect is simulated by commanding the digital signal processor to superimpose an iris shape over the basic shape being displayed.

Another DMD function is the superimposition of any two different shapes or images together to form a resultant image.

Yet another DMD effect is dim. Dimming is done by either turning off a certain percentage of the DMD pixels in order to simulate a dimmer image (e.g., every other pixel), or duty cycle modulating those pixels (alternatively turning them on and off) faster than the eyes' capability of seeing this movement.

Figure 17:
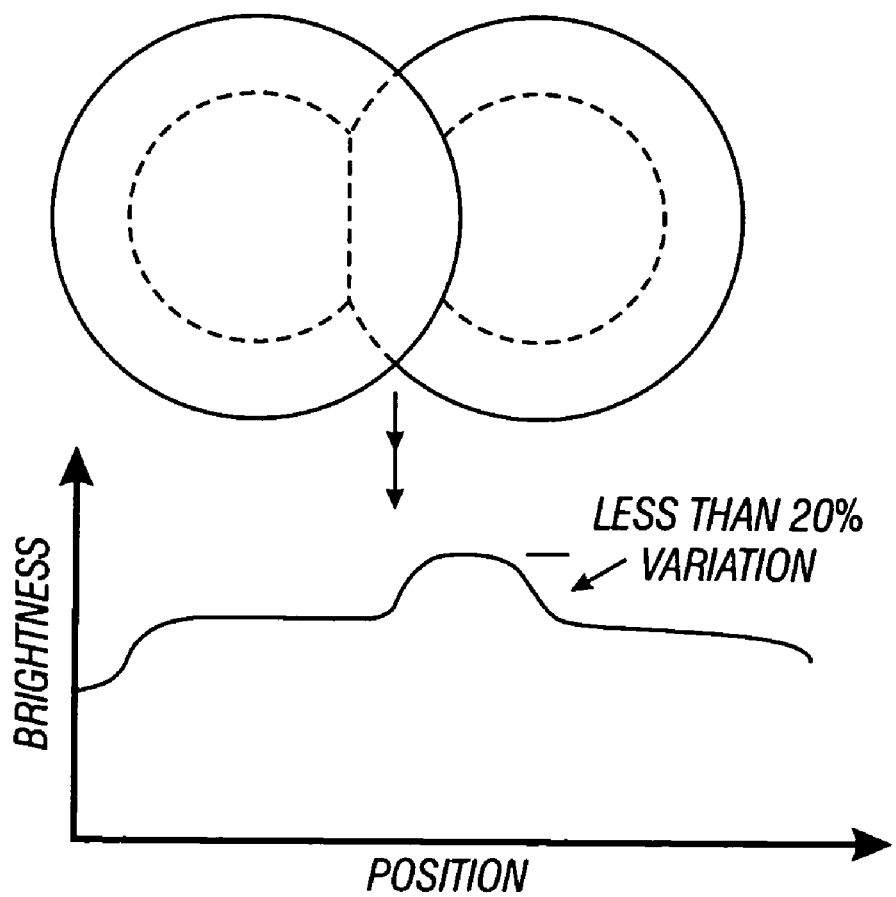
FIG. 17 shows the brightness profile of multiple overlapped beams.

Another possible DMD effect is the simulation of a beam field distribution or profile, e.g., a cosine shaped intensity profile for the spotlight. The inventors recognized that spotlights are often overlapped with other spotlights at their edges. The are of overlap can cause a bright spot at those edges. The DMD is used to form a spotlight with edge portions that have intensities that are lower than the intensity in the center of the beam. The rate of intensity drop off is preferably a cosine function. In this way, when the two edge portions of two spotlights are placed one over the other, the overlap does not appear to be overly bright, e.g. less than 20% as shown in FIG. 17. However, such variable profiles will not be desired in all situations. A variable brightness profile will not be desired in situations where multiple beams will be overlapping at their edges. However, other effects, such as illuminating a gobo, will be better illuminated using flat intensity profiles.

The DMD can be electronically addressed to allow electronically changing electronically changing between these intensity profiles, albeit at the cost of loss of brightness.

Other DMD commands are described in our co-pending U.S. patent application Ser. No. 08/598,077. These effects include, but are not limited to, strobe, flower strobe and others.

The gobo effect can simulate a rotating gobo. This requires the DSP to begin with the image at point x, and rotate the image in a specified direction at a specified speed. The DSP operates at each period of the refresh rate of the image, e.g., each $1/60$ of a second, to calculate the new rotated shape. That shape is used to alter the reflectivity of the pixels of the digital mirror.

In any of these cases, the DSP is instructed to form an image. In the case of a moving image, the next image is formed during the next calculation cycle, e.g. $1/60$ second later. Depending on the gobo rotating speed, the image may have incrementally changed position, or not changed position at all.

At step 1112 the DSP operates to carry out the applied commands.

If there has been no input from the console at 1104, the signal processor checks at step 1120 to determine if a previously processed command is still in process. If so, the next processing operation, e.g. the next image calculation, is carried out at step 1122.

The master therefore assigns top priority to calculation of lighting and effects functions. After all of these functions have been carried out, the system operation commands are detected at step 1130. At step 1132 the DSP checks to determine if it has any requests from the supervisor, and if so evaluates that request. The request from the supervisor can range from shutdown entirely to request for the master controller to relinquish control of any of the subsystems.

At step 1140 the master carries out the miscellaneous functions, which can include responding to requests for status, checking the status of various system functions, a self check, and the like.

At step 1142 the processor waits for its next $1/60$ of a second interval=t+$1/60$ s at which time the next image needs to be processed.

Each image, once calculated, is placed into frame buffer 213, which is for example a dual port video memory. Placement of a new image into memory 213 causes the previous image to be sent to the digital mirror 240 via its interface 238. This hardware effects a double buffering operation which effectively enables the DSP to continue calculating the next image in the sequence while the previous image is being displayed.

Notice again that the master processor is primarily concerned with calculation of the proper parameters to allow the lighting effect to be properly carried out. The master processor is only secondarily concerned with system status.

There can be two separate processors operating the system—the master processor and DSP. The preferred embodiment uses the MVP which carries out the functions of both the processing and digital signal processing.

Figure 2A:
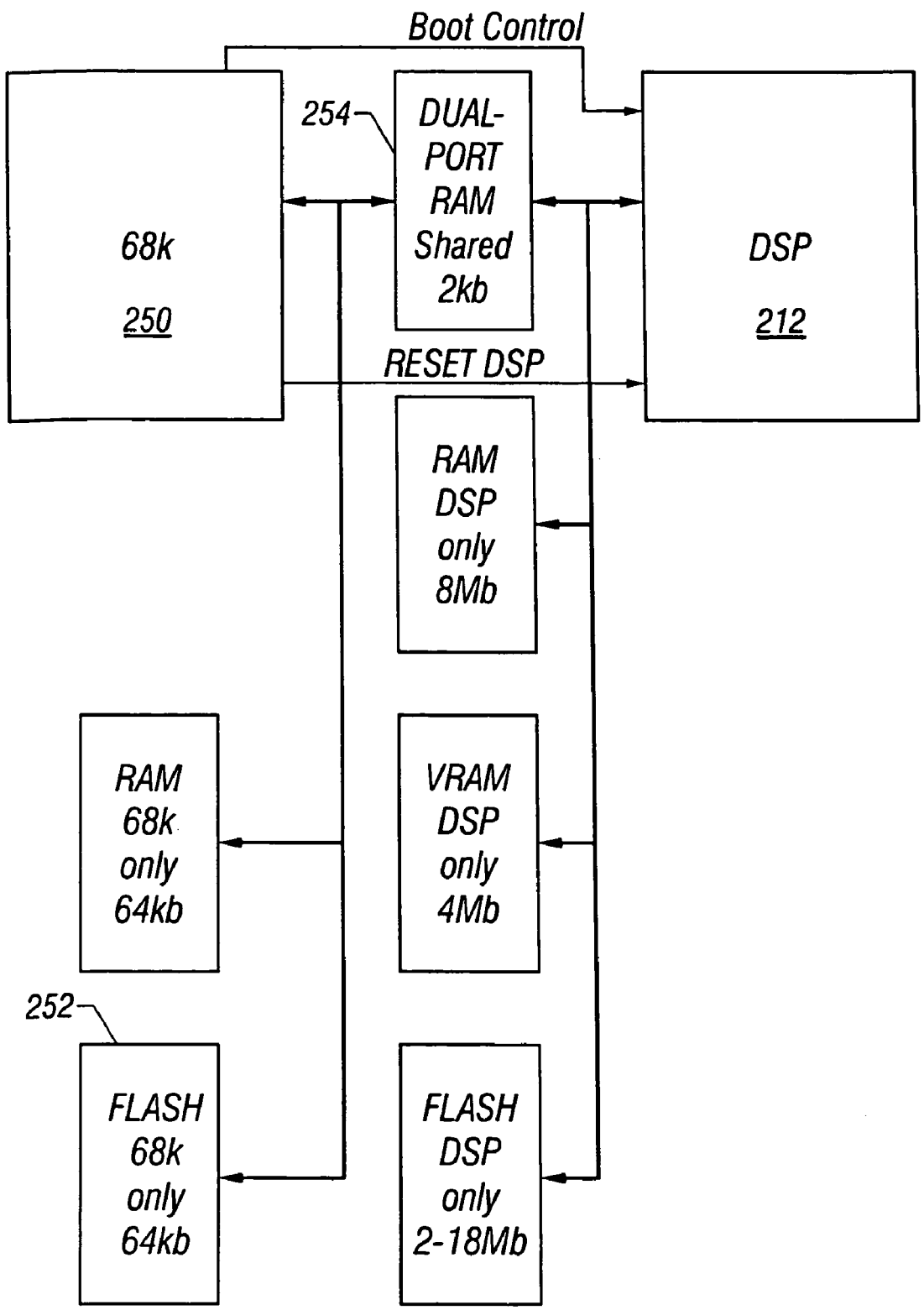
FIG. 2A shows a block diagram of a second embodiment of the electronics, showing the use of a separate processor and DSP.

A second embodiment uses a separate processor and MVP as shown in FIG. 2A. In this case, the master processor is a 68000 CPU 250. CPU 250 holds the DSP 212 in reset until the output power is stabilized. After the power has stabilized, the CPU 250 provides a boot sequence for the DSP 212. This usually is done by moving a boot program from memory 252 to the dual port RAM 254, setting a flag, and then releasing the DSP 212 from reset. The DSP 212 boots from the dual port RAM 254 and loads that information into its own memory. The DSP 212 then operates based on applied instructions.

As described above, an important part of this system is its ability to emulate previous lamp generations. Previous systems created new generations of lamps which required the lighting designers to make a choice between the old lamp generation with its now-limited feature set, or the new feature set; possibly requiring reprogramming of every effect in the entire show. The latter may constitute a formidable task.

An important feature of the new system of the present invention is its ability to emulate previous lamp generations. This allows the previous programs to be used and possibly modified to add improved features. The subsystems that are susceptible of emulation include at least the color selection, gobo, iris, focus, and movement.

The digital mirror device 240 shapes the output light beam. Therefore, proper control of the digital mirror enables control to form a substantial number of different shapes.

Figure 11A:
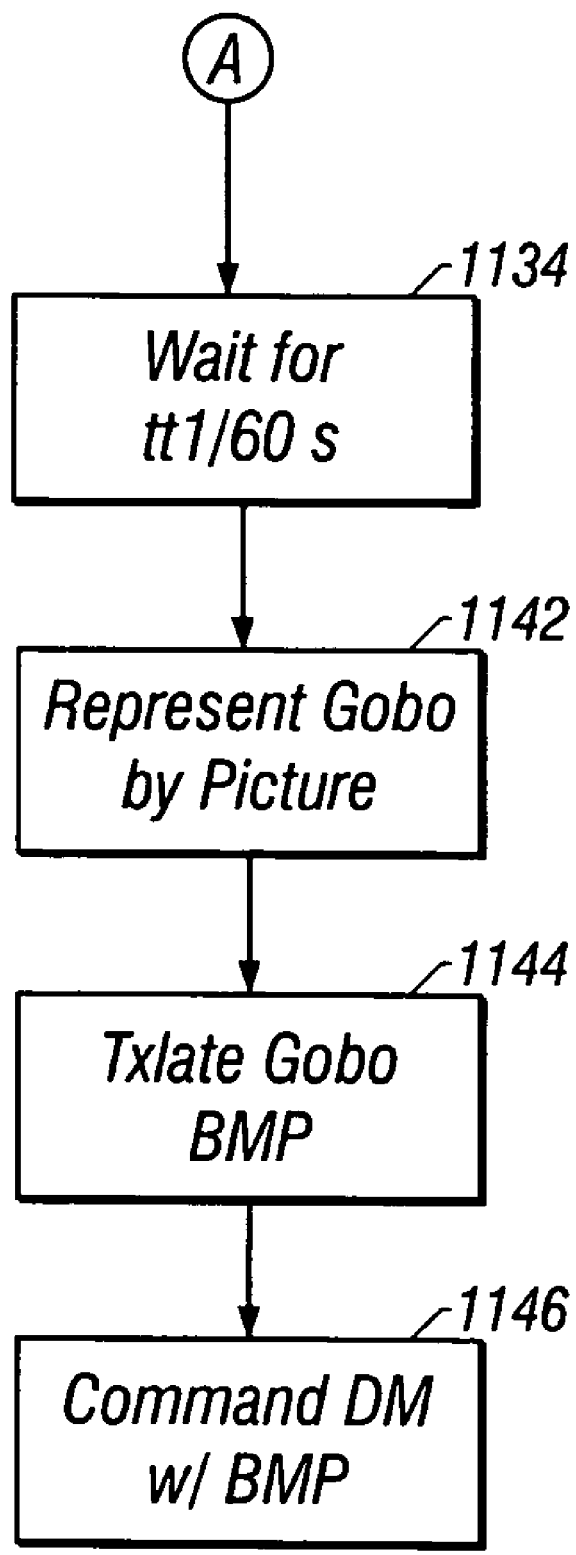
FIG. 11A shows a flowchart of using the master to simulate a hardware gobo.

Emulation of the previous generation of hardware gobo systems requires determination and use of the shapes of the hardware gobos as shown in the flowchart of FIG. 11A. The inventors formulated this as a problem of how to project a relatively simple graphical picture. Each gobo in the previous gobo set is represented by a picture at step 1142. Each picture is translated to a graphical representation, e.g. a bitmap of the pixel area, at 1144. That graphical representation is used to command the digital mirror at step 1146. Therefore, each gobo in the previous generation gobo set is translated to a digital mirror command set that emulates the hardware gobo.

The actual output to the digital mirror device is in a proprietary format specified by Texas Instruments, the manufacturer of the digital mirror device. Texas Instruments' interface board accepts a sequence of binary values, each corresponding to an intensity of the pixel on the DMD. The interface board converts that sequence to its proprietary format.

The inventors recognized that information storage in this DMD system is a serious issue. For an image of 1280 by 1024 pixels, the image itself is formed of $140,000_{HEX}$ which equals approximately 1,310,720 pixels. A 1024 pixel circle is formed by 823,550 pixels. The average image hence uses somewhere between 800,000 and 1.3 million pixels. Storage of such graphical pictures takes a large amount of storage space. The files are preferably stored in some compressed form; more preferably as a vector representation of the file. The preferred storage formats include HPGL and DXF formats. However, any format which represents a shape by a format which is compressed relative to a bitmap is preferred.

Projection of a stored gobo is accomplished by reading out the vector representation, converting the vector representation to a pixel based output such as a bitmap (step 1144), and commanding the digital mirror using the bitmap file (step 1146).

The emulation technique therefore converts this information into an emulation of a hardware gobo. This hardware gobo can be exactly what is found in the previous lamp generations such as the ICON™. Use of the RGB wheel synchronized with the digital mirror commands also allows the gobos to be projected in any desired combinations of multiple colors. However, use of the RGB wheel requires dividing the system into multiple frame portions. Hence, the image intensity will accordingly degrade.

Another issue in the DMD is caused by its lack of persistence. Since the DMD has no persistence, images cannot be formed by building up two sets of alternate lines of the image, as is frequently done in video projection. Accordingly, the system displays an entire image at each one time. Double buffering is used. One image as produced is stored in VRAM which the next image is being calculated.

Each of these images uses on the order of a million pixels for each image. Hence a million pixels need to be calculated for each image operation.

Manipulation of the image is similarly complex. The ICON™ system uses a hardware gobo which can be rotated by motor and drive system. This simple operation is simulated in the Medusa by calculating each rotated position in FIG. 11 each interval of the refresh rate at step 1142. The calculation of a million pixels in $\frac{1}{60}$ of a second, for example, however, requires that a matrix multiplication be carried out in 20 ns.

The TI MVP has the capability of making those calculations in that time. However, this leaves only minimal time for monitoring the remainder of the system. This system uses a supervisor unit for redundant monitoring operation so that the system is properly monitored no matter how large the calculation load.

In contrast to the master DSP 212, the supervisor 230 is primarily a system status determination unit. The supervisor 230 carries out a number of functions, including primarily detecting whether the system, including the master DSP 212, is operating properly. The supervisor 230 also carries out a number of secondary functions, including logging a registry of events and faults, igniting and dousing the bulb, control of fan speed, and responding to user requests for status.

Figure 7:
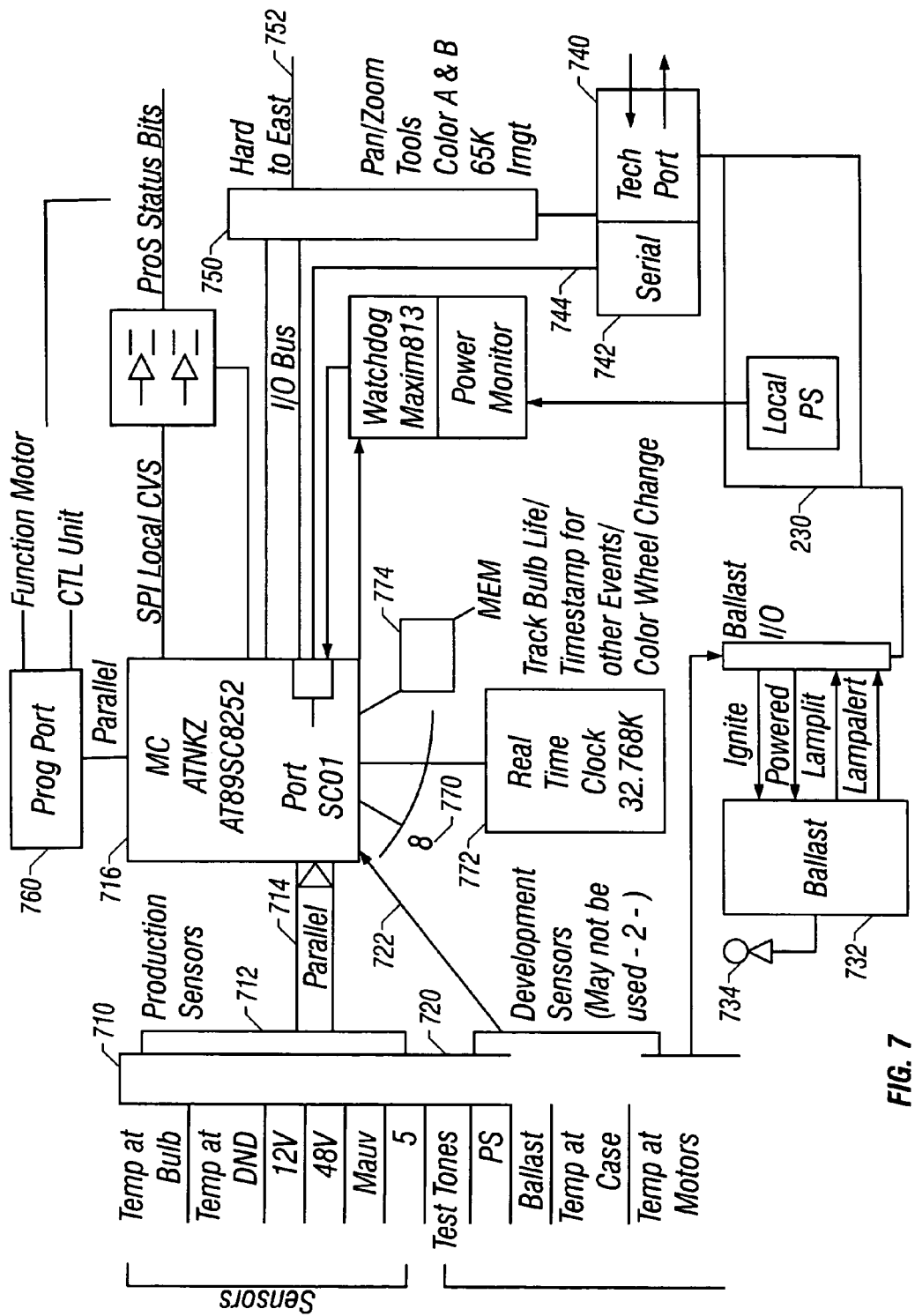
FIG. 7 shows a block diagram of the controller used according to the present invention.

A block diagram of the supervisor unit 230 is found in FIG. 7.

A first connector 710 includes various system monitoring inputs. Connector 710 receives inputs from many of the sensors which sense the parameter values in the system. This includes the temperature at the main bulb which forms the main lighting source for this system, and the temperature at the digital mirror device. The power supply may be separately sensed by a power supply sensor, e.g., of the $I^2C$ type. These and other inputs are multiplexed into a stream by communication device 712. The information forms stream 714 which is coupled to microcontroller 716. The microcontroller 716 is preferably an ATMEL AT89S8252.

The inputs to the controller 716 represent many of the parameters which can be monitored by the system.

The sensor block 710 includes those sensors known as the production sensors. These devices will be used in all units which are eventually made. A second set of inputs 720 are called the development sensors. These sensors will be monitored during development but might not be used in the actual production device. The development sensors include a number of test temperatures at various places within the unit, including power supply temperature, ballast temperature, case temperature and temperature at motors. The development sensor output 722 is multiplexed and sent to microcontroller 716.

The ballast monitoring section 730 connects directly with the ballast 732, which drives lamp 734. The ballast is preferably a solid state type electronic switching ballast. It should be understood that the parameters shown in FIG. 7 are only exemplary. Outputs to the ballast include ignite and power control respectively which start the lamp and control the power of the lamp. The ballast also includes parameter returns including a parameter indicating that the lamp is lit and a lamp alert indicating a problem or short in the lamp, or lamp deterioration due to age.

The microcontroller 716 also communicates to tech port 740. The tech port allows low level communication with the lamp device. Serial information is received from tech port by uart and presented to the microcontroller 716 over parallel data bus 744.

The main IO connector 750 provides the main input and output to the device. A reset system allows sending a hard reset which to each of the slave processing subunits in the system. This operation enables the microcontroller to totally reset the subassembly if problems are determined.

The reset is effected without a dedicated reset line by using a timeout operation on the serial bus. The serial line is normally high, e.g., 5 volts, to indicate an idle state. A communication is sent by bringing the output alternately low and high. According to this system, a timeout is caused if the output signal is low for too long a time. For example, tmax, indicating the longest time that the signal can stay in one state without transiting, may typically be 3 byte times, e.g. 100 µs. If the signal stays low for longer than 3 byte times, all hardware monitoring the communication is reset. The slave processing systems are therefore reset by maintaining the signal low for longer than 3 byte times.

Inputs and outputs are also provided for various control features including pan and tilt, zoom, focus, color processing and the image processing.

Input area 760 is a programming port which enables programming of the flash memory within the microcontroller 716 at manufacture or during software updates.

The watchdog supervisor unit receives a working clock of 8 MHZ for a 250 Kbaud bus; element 770. A real time clock 772 is also provided. The operation of the supervisor maintains a registry of various events in working memory 774.

For example, the supervisor tracks bulb life by storing an indication of bulb changing along with the current time stamp, each time a bulb is placed into service. Time stamps for other events are also stored. The supervisor also keeps track of certain events, including removal of certain subsystems. It is presumed that these subsystems are serviced when removed.

Certain changes which cannot be automatically detected, such as the time since bulb change, are manually entered into the registry through the tech port. This information can be obtained over the programming port 760 or over the tech port 740. This enables determination of the life of various elements.

The information in the registry can be read by a serial device over tech port. An alterative embodiment allows the information to be commanded to be displayed by the lamp itself. A lamp display command causes the messages to be converted to fonts and used to control the DMD to display the text as a shaped light output. This allows detecting the contents of the registry without a dedicated display terminal using the existing digital light altering device as a display mechanism.

Figure 12:
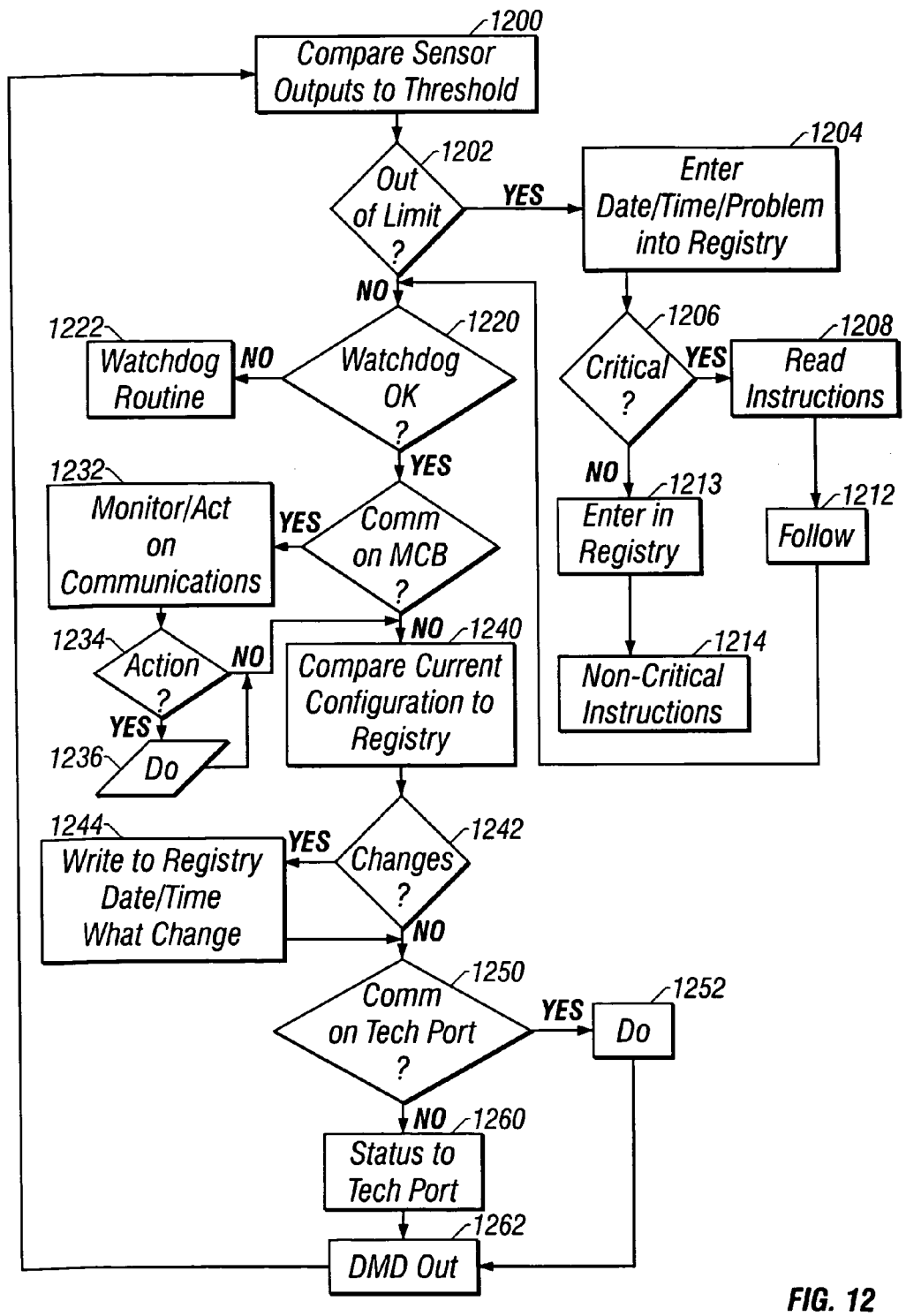
FIG. 12 shows a flowchart of operation of the supervisor.

FIG. 12 shows a flowchart of operation of the secondary supervisor. It should be understood that the processes are preferably interrupt-driven.

The supervisor begins its monitoring loop at step 1200 by comparing the sensor outputs to thresholds. The various sensors which are monitored are described above, and the thresholds can be adaptively set.

Step 1202 determines whether any of the sensor outputs are outside of predefined limits. This detection begins an out of limit processing routine, of which the first step 1204 enters an entry into the registry indicating the fault. The registry entry includes an indication of a date and time from the date stamp, as well as an indication of the problem itself. The registry is preferably maintained in non volatile ("NV") RAM so that the registry entry persists even when power is shut down.

Step 1206 determines whether the present overlimit is critical. A critical overlimit might be a temperature which is sufficiently high, for example, that it poses a risk of fire damage or otherwise requires shut down of the subsystem. If the present problem is over a critical limit at step 1206, step 1208 represents a step to obtain instructions for the particular subsystem being monitored. For example, if the system monitors a temperature of 450° C. on the ballast, and this is over a critical limit, step 1208 is a step of downloading how to handle ballast overtemps. Since the ballast is such a crucial part of the lamp, it may very well be that this requires shutdown of the entire lamp. Alternatively, some subsystems may allow shutdown of only that subsystem while maintaining the rest of the lamp. Step 1210 represents following the instructions which were downloaded at step 1208.

In some circumstances, it may be desirable to relay a status bit to the console indicating that this critical limit has been exceeded as shown at step 1212.

The processing operation of steps 1208/1210 occurs when the parameter is detected to exceed a critical limit. If step 1206 determines that the operation is not over a critical limit, then the fault is a noncritical limit by process of elimination. Step 1214 represents the operation of reading the instructions that are adapted for a noncritical limit.

All of the noncritical limits are entered into the registry at 1204. Certain noncritical limits may result in, for example, modifications to operation which may tend to allow the system to operate more effectively. For example, if the limit is an overtemp in the ballast, then the operation may carry out a noncritical limit instruction such as reducing the ballast output by 20% or increasing the amount of cooling.

At the completion of either of these routines, control passes to step 1220 which represents the watchdog routine. The watchdog routine operates as a conventional watchdog. Typically, a special line is attached to the processor. The processor program includes a routine for toggling that line periodically, e.g., every 10 µs. If there is no toggle within the preset time, then a watchdog fault is determined at step 1220. A conventional watchdog processing routine is carried out at step 1222. This includes entering a processor fault in the registry, and then sending a hard reset to the master processor. If another processor fault occurs within a certain time, the system may respond by sending another reset to the processor or by shutdown.

Step 1230 represents detection of a communication on the motor control bus. This communication is monitored at step 1232. Any necessary action is determined at step 1234 and is carried out at step 1236. If no action is required, control returns to the main processing loop.

Step 1240 represents the registry update routine. The current registry configuration is compared with the registry of configuration data that is stored in the nonvolatile memory. Step 1242 determines if there have been any changes to this configuration. If so, information is written to the registry including date and time of the change detected at step 1244, and what change was detected. Processing returns to the loop to step 1250 which represents the tech port communication routine.

Step 1250 indicates that a communication on the tech port has been detected. This communication can be a command of the supervisor to carry out any of a number of functions. Step 1252 schematically represents carrying out those functions.

Step 1260 represents the sending of status to the tech port. A new parameter is sent to the tech port each 15 seconds, to allow monitoring of parameters.

Step 1262 represents the DMD display routine. When activated, this displays the contents of the registry and the most recent parameters on the DMD, so that projected light is projected in the shape of the information to be displayed or its complement.

The overall system control of a lighting system has been typically accomplished from the console. The console couples commands to each of the commanded lamps. An alternative communication and control scheme is made possible by the use of tech port 231 on the supervisor. The tech port is a serial I/O port which allows operation as discussed herein. In summary, the tech port allows monitoring and control of an individual lamp via a simplified interface. As part of this monitor and control, the supervisor sends a status report to the tech port at step 1260.

The supervisor also has overall control over the operation. For example, if the temperature sensor determines that the lamp is too hot (overtemp), the lamp operation itself may be reduced or extinguished. The supervisor may hence respond by shutting off or reducing the output of ballast 234.

The tech port communications device is preferably a wireless communication system. A preferred device is a serial device 1000, e.g., a device with a small display 1002, and an infrared communications port 1004. This configuration allows the technician or other monitoring personnel to move from area to area with a hand held terminal. As the technician comes into proximity of a specific luminaire, the technician can monitor and control that specific luminaire.

The supervisor can be controlled itself through the tech port 231. One particularly preferred embodiment provides an infrared transceiver on the tech port which is commanded by infrared hand held tech port supervisor 102. Preferably this uses off the shelf hardware to allow communication between the tech port and its tech port controlling device.

One use of the tech port is to allow the downloading of diagnostic information and troubleshooting aid information. The supervisor stores, and allows downloading via the tech port, a number of information pieces which can be useful in diagnosis. One important operation is the history from the registry; including information about different parts of the lamp. For instance, the supervisor monitors color changer status. When a color changer is removed, the supervisor may determine via the FIG. 12 flowchart, that the bulb has been removed. The supervisor stores a time stamp indicating that the bulb has been removed. This indicates life: how long has this device been in service. The monitoring entity can determine how likely it is that the device may need to be replaced. Another use for the tech port is actually during service. As described above, in this operation the supervisor assumes that if a device is removed, it has been removed for replacement. However, there may be times when a service technician removes the device for some other reason. At those times, the service technician can use the tech port to tell the supervisor not to reset the previous time stamp: essentially to maintain that time stamp as it was previously.

Another operation is determination when any particular item has been serviced, including for example the ballast and the color filters. Servicing of the color filters or the ballast leaves a time stamp in the supervisor indicating that these items were removed at that time.

Various places in the lamp are monitored by temperature controllers as described above. Those places in the lamp can be monitored through the infrared tech port or by direct connection to a printer.

Another determination made by the supervisor is when a subassembly/subsystem card was last swapped out. The supervisor maintains a registry of the serial numbers of each card that are present in the device. When a new card replaces an old card, the serial number changes. The supervisor hence can detect a serial number change to determine that a card has been changed.

This solves a specific problem in the art. Road technicians typically operate under stressful and difficult circumstances. The inventors have found that when road technicians carry out certain operations, it becomes difficult for them to write things down. This becomes a way to relatively easily figure out many of the things they have done, since the supervisor automatically maintains an indication of what has been done.

The infrared hand held tech port can use relatively simple software such as "hyperterminal" with an infrared port. Alternately, the tech port can use relatively more complicated software as discussed previously which receives only certain messages which the terminal device needs to decode. Preferably, however, the terminal is a dumb terminal that uses no software at all.

Each specific subassembly has an assigned serial number between zero and $2^{32}$. Each serial number is unique to a specific card.

The subassemblies also have an address. The address is set by the specific slot in which the assembly is placed. The address is a hard-wired 8 bit number that allows communication over the motor control bus to any device plugged into the specified slot.

Figure 10:
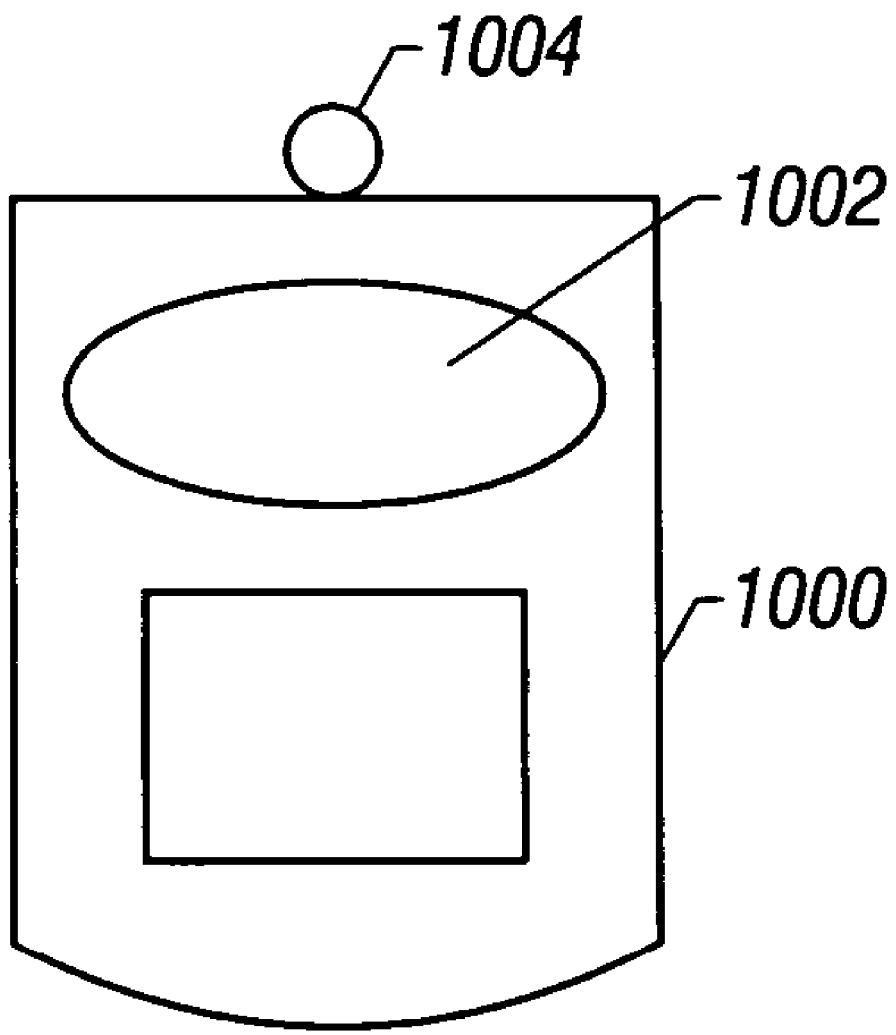
FIG. 10 shows a diagram of the wireless communication system including hand held infra red tech port commanding device.
Figure 10A:
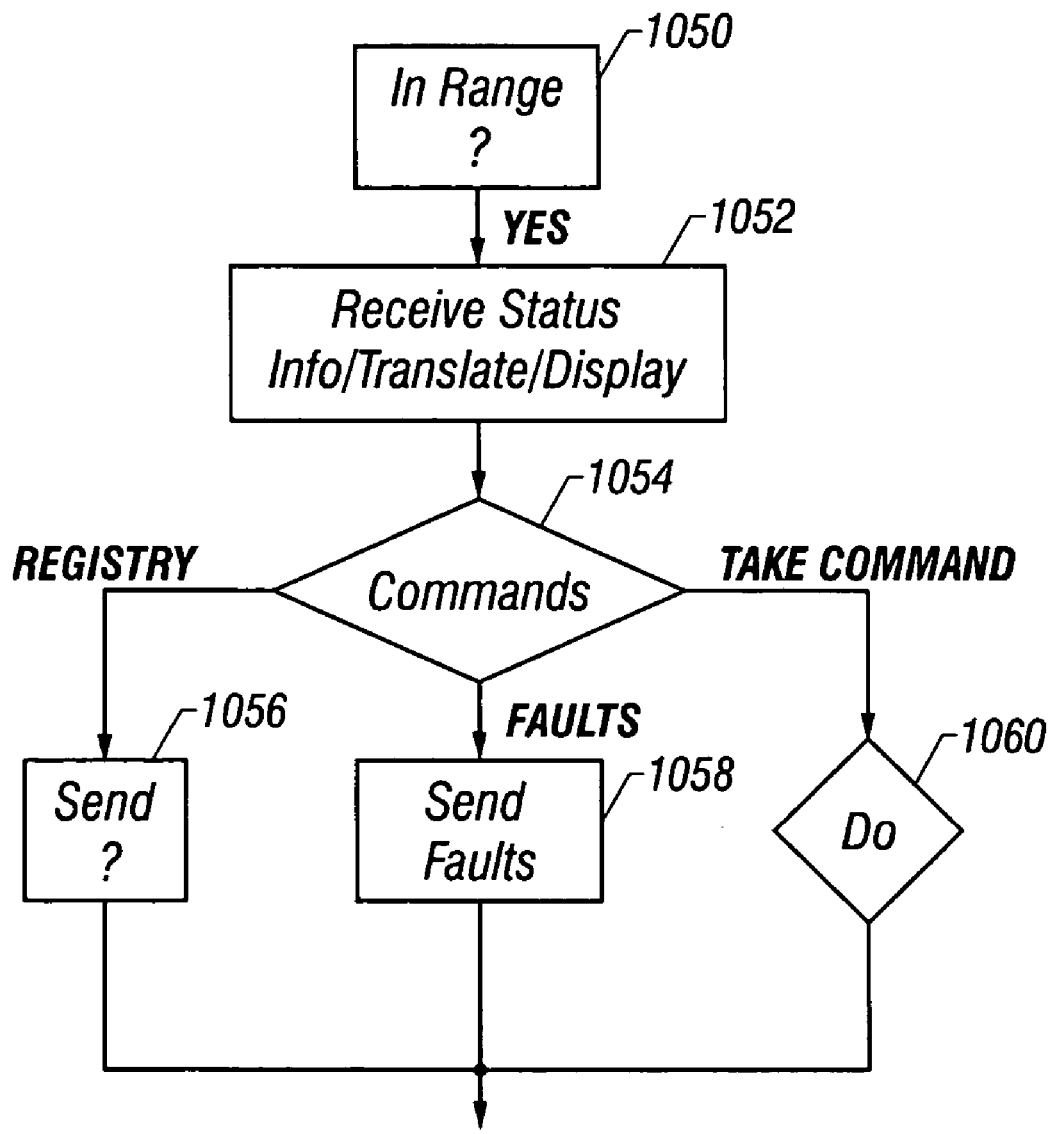
FIG. 10A shows a flowchart of operation of that device.

A diagram of the tech port communication device is shown in FIG. 10. The operation of the tech port is described with reference to the flowchart of FIG. 10A. At step 1050 the device determines whether it is in range of a particular light. When the device comes in range, it receives the status information, representing the significant events which have occurred since the last status update. The tech port device is preferably a dumb terminal, but the device may alternately be a palmtop or the like. This status information may be in some compressed form if a more intelligent system is used. For example, error numbers could be communicated, and converted to textual information indicative of the textual information.

Step 1054 represents commands being sent from the hand held tech port to the tech port device. The commands shown in step 1054 include registry faults and take command. Other commands could of course be alternatively entered. At step 1056, the registry operation requests that the most recent entries in the registry be sent. At 1058, in response to the send faults command, the most recent faults are sent. At step 1060, a command is sent to the master indicating that the supervisor requests to take control of a particular lamp.

Imaging

One important flexibility of the present system is its capability to form virtually any image as its gobo outline. The system can also use many other kinds of images.

Photographic bitmaps are formed from color images, e.g. of 256 colors. The color images are converted, using known techniques, into data indicating chrominance and luminance of portions or pixels of the images. The luminance (Y) values corresponding to the 256 colors are then used to form an 8 bit gray scale. This allows photographic bitmaps to be scanned in and used as a gray scale gobo using the flowchart generally shown in FIG. 11A.

Other image operations which can be carried out by the digital signal processor include special functions. The DSP includes functions allowing operations to focus, defocus, hard edge and soft edge. The DSP also allows forming multiple superimposed images.

The DSP can calculate a resultant image as a result of superimposition of any number of images upon one another. This can form a gobo outline.

Another such superimposed image superimposes an iris image on top of the image to simulate the operation of an iris.

Another such superimposed image is the use of multiple gobos, each of which operates the image. For each of these operations, the system requires correspondingly more calculation power.

Another DSP operation is the frame grab operation. Selection of the analog signal from the video grabs the frames from the applied video. Each image is then digitized and displayed.

Figure 4:
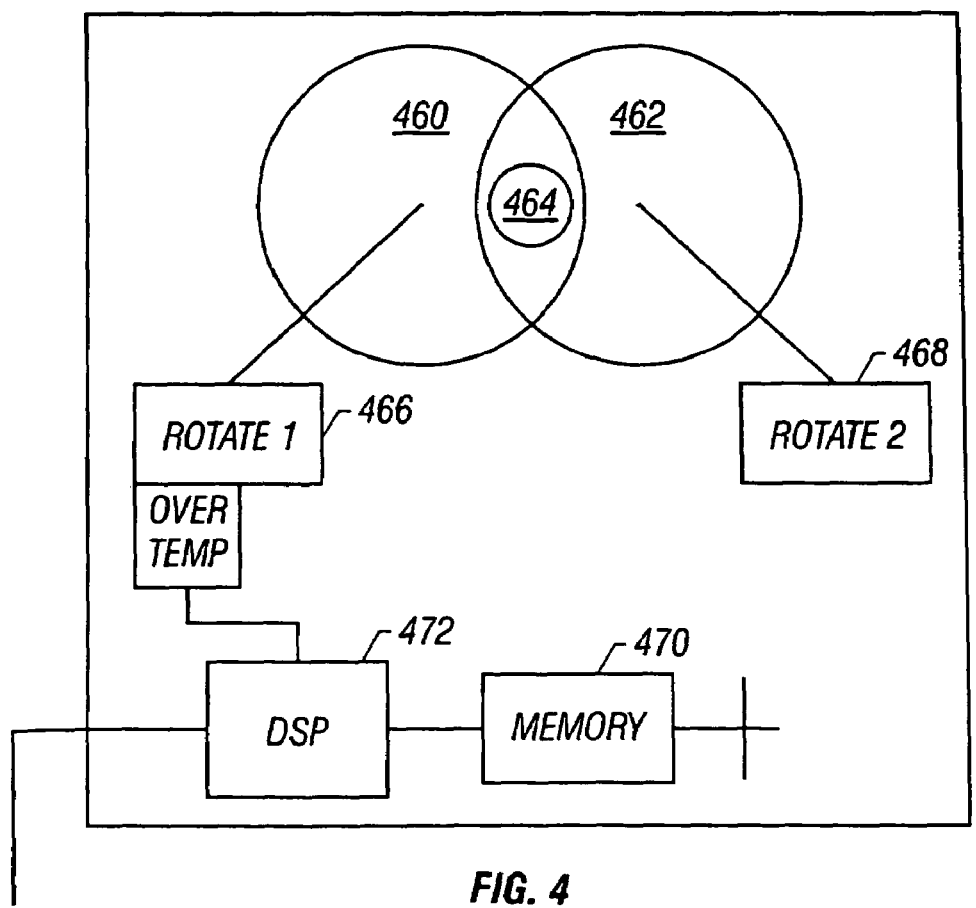
FIG. 4 shows a motor control subassembly.

The system of the present invention uses slave processing boards to control each motor, as shown in FIG. 4. The FIG. 4 subsystem is a color changing system, including color crossfading discs 460 and 462. A point where the two discs cross forms the optical gate 464. Each of the discs has an associated driving motor 466, 468 which drives the rotational position of the discs.

The color cross fader 308 preferably uses cross fading discs of the type shown in our U.S. Pat. No. 5,426,276. These discs, in summary, have characteristics whereby the relative positions with respect to one another are changed to allow a different passband based on the relationship between the cutoff wavelengths of the two different discs. The passbands can be continuously changed to continuously change the color of the projected light.

The inventors have found that in practice these discs show wavelength cutoff tolerances, which are believed to be due mostly to the dichroic deposition process. These tolerances cause the start frequency and end frequency to vary from disc to disc. The calibration operates by determining a start point, determining an end point, and finding a location of a specified center point. This information is used for calibration purposes, since it compares the specific operation of the discs with other discs.

For example, a dichroic coating which begins at a pass frequency of 350 nm has a normal coated tolerance which can vary from between 340 and 360 nm, for example. The linearity for any disc is consistent over the disc. However, the absolute calibration of the disc is not consistent between different products.

The discs are calibrated using spectral measurement equipment. Each disc is carefully calibrated. Its values, i.e., position of the disc relative to passband of the position on the disc, is stored in the associated memory 470 that is associated with the card. Therefore, each color filter is associated with a stepper motor which is controlled by the calibrated information.

Figure 4A:
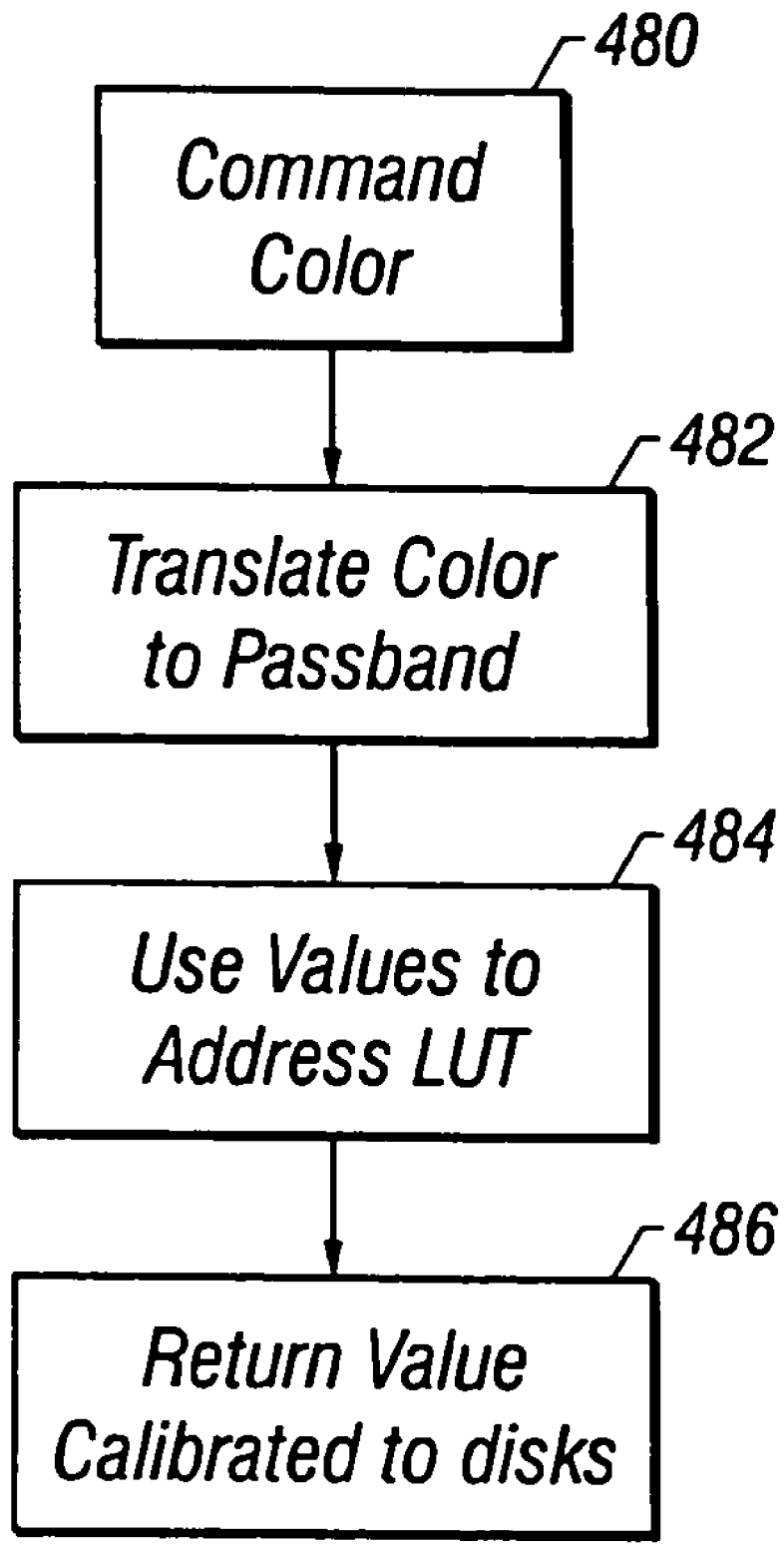
FIG. 4A shows a flowchart of operation of the motor control subassembly.

A command operation is illustrated in the flowchart of FIG. 4A. A command for a certain color combination is made as command 480. This command is translated by the internal DSP 472 into a pair of pass bands for the long and short color wheels 460, 462. This command is therefore translated into a desired long passband value and a desired short passband value.

The memory 470 stores a transfer function that represents a calibrated relationship between the position of the wheels and the passbands. The transfer function can include a variable that acts as a multiplier for scaling the specific disc to a theoretical "ideal" disc. The on-assembly DSP scales each disc according to the variable, so that each disc operates in the same way.

These advantages are obtained by maintaining all motors on or associated with a dedicated assembly as shown in FIG. 4. This allows the controller in each card to be preselected with a calibration value that tells that controller the exact value of the color device on its value. The cards stay and are maintained with the assembly. Therefore, each card can command exact color values. A command, therefore, for 350 nm can be adjusted by the calibration to command 350 nm more exactly.

A similar calibration operation could be used to maintain the accuracy of any other moving structure.

As described previously, the system preferably includes an RGB wheel 310 that can be moved in and out of the path of the light beam. The purpose of the RGB wheel is to enable the images to be displayed in full or multi color.

The inventors recognized that many effects or images can be carried out without this multi color. Moreover, using this RGB wheel also has a cost: it sacrifices a large percentage of the brightness because of the duty cycle between the three colors. The inventors realized that it would be desirable if there was a mechanism for operating the device without the RGB wheel when monochrome images were displayed. This is effected by moving the entire RGB wheel in and out of the beam of the lamp.

The movement operation of this embodiment is made more rapid by balancing of the weight of the RGB wheel against some other structure which is correspondingly moved.

The movement operation of this embodiment is made easier to achieve and control by balancing the weight of the RGB wheel against some other structure which is correspondingly moved.

Figure 5:
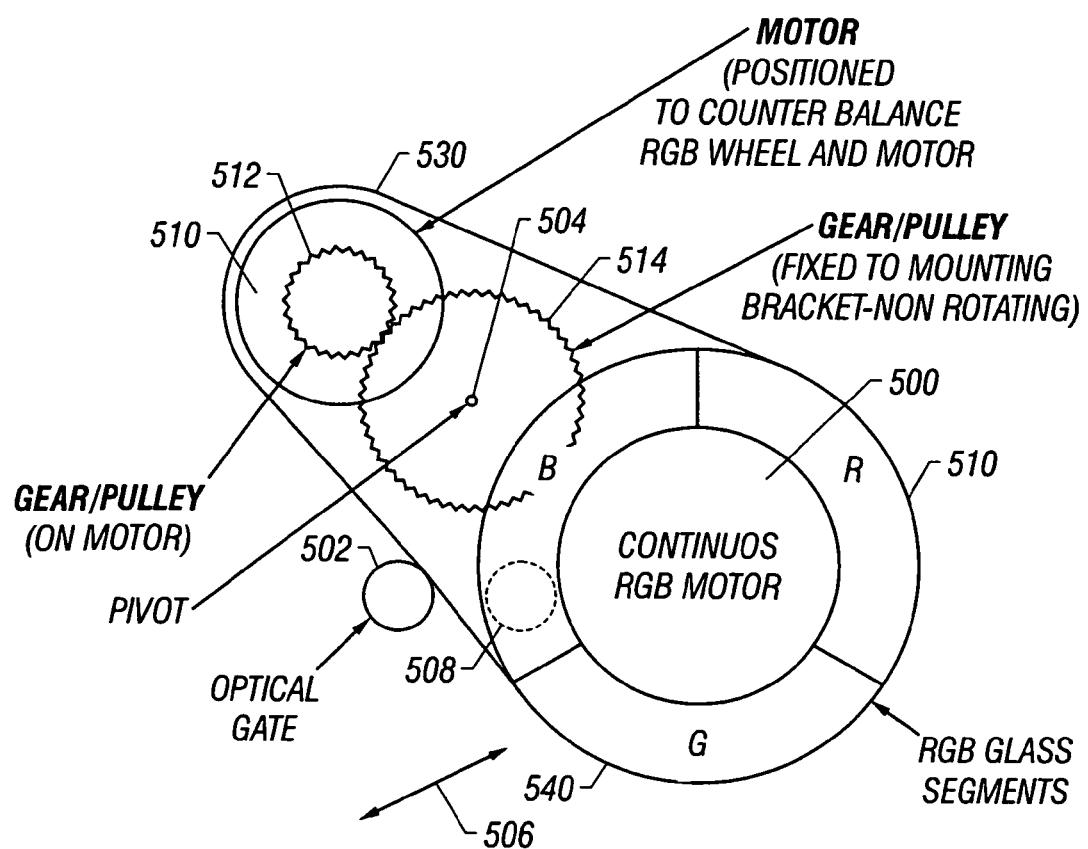
FIG. 5 shows a moving balance device for a moving optical element.

A first embodiment of the balance system is shown in FIG. 5. FIG. 5 omits the drawing of the mounting bracket. The RGB glass segment assembly 510 is shown. This includes two, half size red glass segments, a green glass segment and a blue glass segment. The entire device is rotated by a synchronous RGS motor 500.

The path of the light beam is shown by optical path 502 which corresponds to the location where the light beam travels through the filters.

The RGB assembly is shown in its outer position in FIG. 5 with the RGB device positioned outside of the optical path. In this position, the RGB assembly has no effect on the projected light. The RGB assembly shown in FIG. 5 can be moved into the optical path by pivoting relative to pivot point 504 along the arrow shown as 506.

The pivoting operation is carried out by using a motor 510 which is positioned to act as a counterbalance to the RGB wheel and synchronous motor. The motor includes a driving element 512, e.g., a gear, which positively engages with fixed non-rotatable driving element 514, e.g. another gear, to move the assembly. Alternatively, driving elements 512 and 514, could be pulleys which positively engage each other by means of an appropriate drive belt or similar. This causes the motor to travel around the driving element.

In operation, the RGB motor is moved from a neutral position shown in FIG. 5 to a light altering position where the optical gate is at the location 508 shown in FIG. 5. The motor 510 is rotated to move the driving element 512 and correspondingly rotate around the fixed, non rotatable driving element 514. This rotates the entire assembly such that the top portion 530 is moved to the right in FIG. 5 while the bottom portion 540 is moved to the left in FIG. 5. The motor 510 is located within the assembly such that the movement of the motor 510 substantially precisely counter-balances the RGB wheel and motor. This counter-balance operation enables the RGB assembly to be rapidly moved without being affected by the spatial orientation of the overall fixture.

Figure 6:
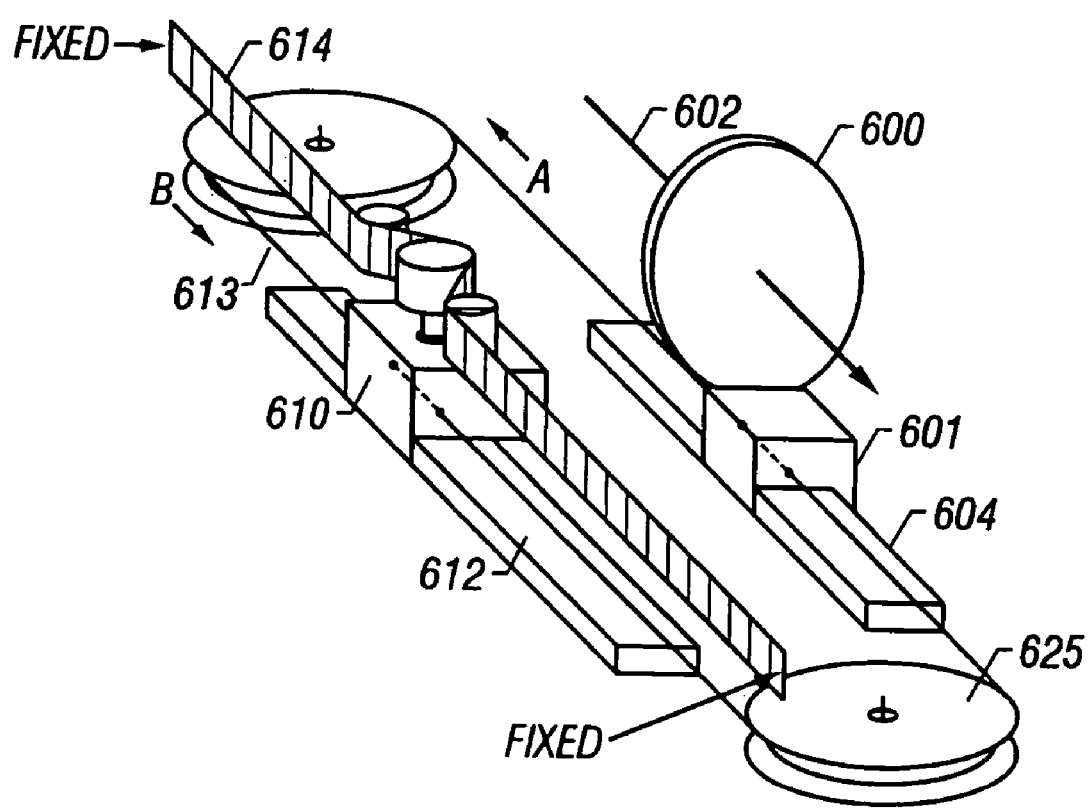
FIG. 6 shows an alternative embodiment for the moving optical element balancing device.

A second embodiment of this operation is shown in FIG. 6. This second embodiment of the balancing element is optimized for use in moving a lens system. The lens 600 is positioned within the optical path 602. Lens 600 is positioned on linear bearing 604 to move in a direction substantially parallel to the optical path. Movement of the lens either in the forward or in the reverse direction, however, can change the balance of the lighting fixture, thereby effecting overall performance of pan and tilt functions. The inventors recognized the desirability to maintain overall balance of the fixture regardless of the lens positions within the fixture, thereby maintaining consistent performance of pan and tilt functions.

A driving motor 610 is also mounted on a linear bearing 612. Linear bearing 612 is substantially parallel to the linear bearing 604. The driving motor is attached to a fixed, non movable length of belt 614 which is substantially parallel to linear belt 612. Belt 614 includes teeth which positively engage with the corresponding teeth on the motor pulley. The motor is also attached to a wire loop 613, which wraps around idler pulleys 625, and connects to lens mount 601.

In operation, the lens and motor move in reverse synchronization with each other. Since the belt 614 is fixed, movement of the motor moves the motor relative to the belt. The wire is attached to the motor, so that movement of the motor pulls the lens mount 601 in proportion to the amount of motor movement. Hence, when the motor moves in the direction B shown in FIG. 6, the lens correspondingly moves in the direction A shown in FIG. 6. This maintains a constant center of gravity between the motor and lens.

An alternative embodiment uses either two separate pulleys or a two stage pulley on the motor. The two pulleys or stages having different numbers of teeth to each other. One pulley or stage engages with a fixed non-movable belt to move the motor along the linear bearing as described in the previous embodiment. The other pulley or stage positively engages with a continuous toothed belt loop which essentially replaces the wire loop as described in the previous embodiment. The continuous belt loop is fixed to only the lens mount so that as the motor rotates and consequently moves along the linear bearing to which it is mounted. The lens moves proportionally an in a direction relative to the motor, according to the ratio between the number of teeth on the two pulleys or pulley stages on the motor.

In a particularly preferred embodiment, the motor is selected to be the same weight as the lens. This can also be operated by choosing a lighter motor and adding appropriate weights to the motor to exactly counter-balance the motor relative to the lens, or if the chosen motor is heavier than the lens, adding weights to the lens mount to achieve the same. Since the same amount of weight is moved in opposing directions, the motor and lens balancing is the same in any position.

Figure 3:
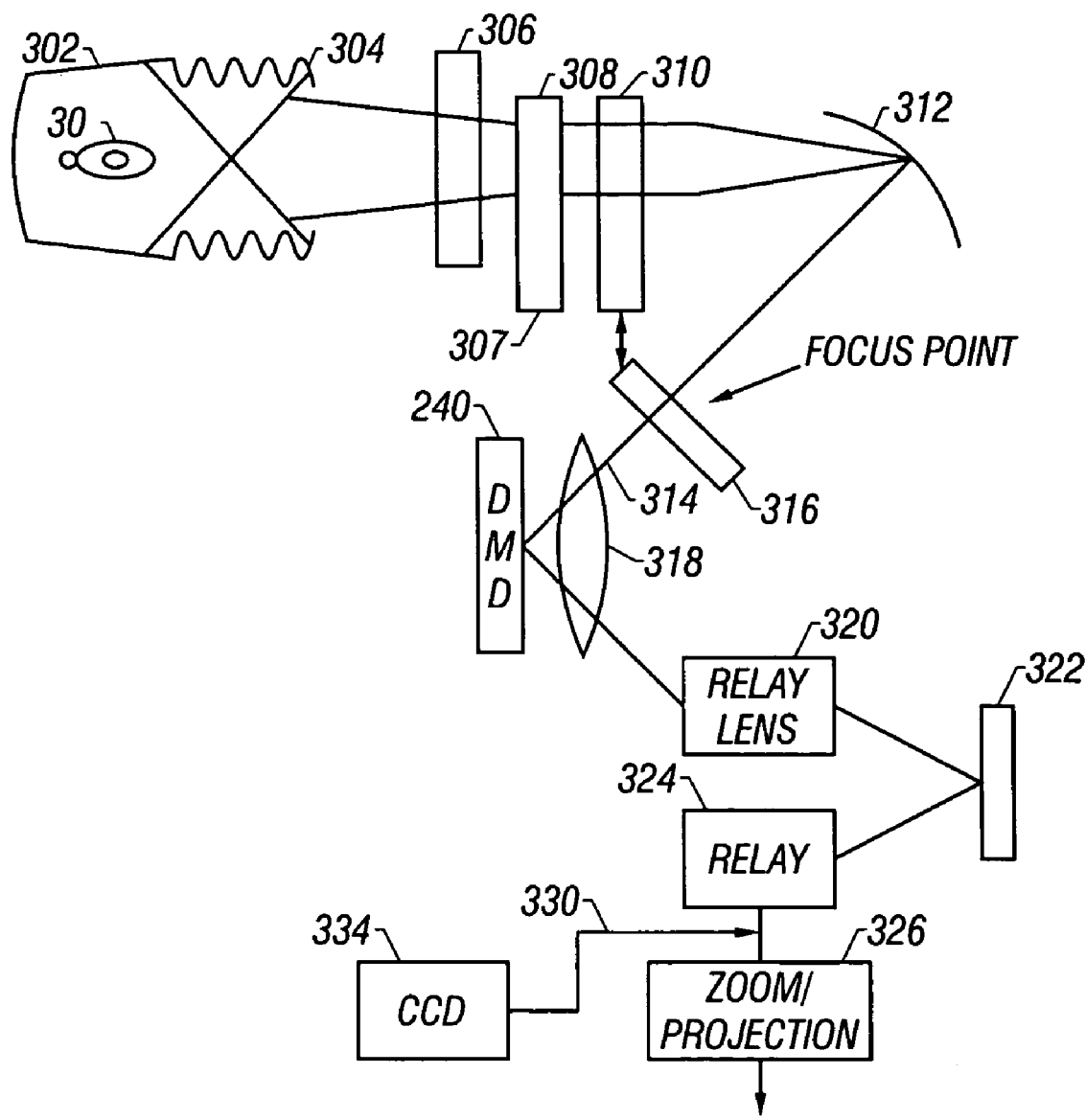
FIG. 3 shows a block diagram of the system optics.

FIG. 3 shows a block diagram including further detail of the system optics. The system uses a segmented retroreflector with a 1,200 watt arc bulb. The segmented retroreflector is a design of Radiant Imaging, Inc.

The segmented retroreflector 302 is shown in further detail in FIG. 3A. The device uses an almost elliptical cold mirror reflector 350, along with a special reflecting portion 304 including a series of retroreflectors which send a portion of the light back into the arc.

This allows different handling of the three different light directions that are output from the bulb 300. A first light, 352, is output toward the target, and is allowed to pass unobstructed. A second light, such as 354, is produced in the reverse direction, facing away from the target. This light is reflected by the cold mirror reflector 350, toward the focal point of the ellipse and against cold mirror 306. A third light, such as 356, is reflected to retroreflectors 302. Each retroreflector 302 is a section of a sphere that reflects the light impinging on that section back to the position of the arc lamp, through the position of the arc lamp, to the elliptical reflector 350 and focused back to the focal point.

A particularly important part of this invention is its heat handling capability. This is done by a special combination of heat altering elements which remove much of the heat before the light passes to the heat sensitive portions of the system, including the digital mirror 240.

Figure 3B:
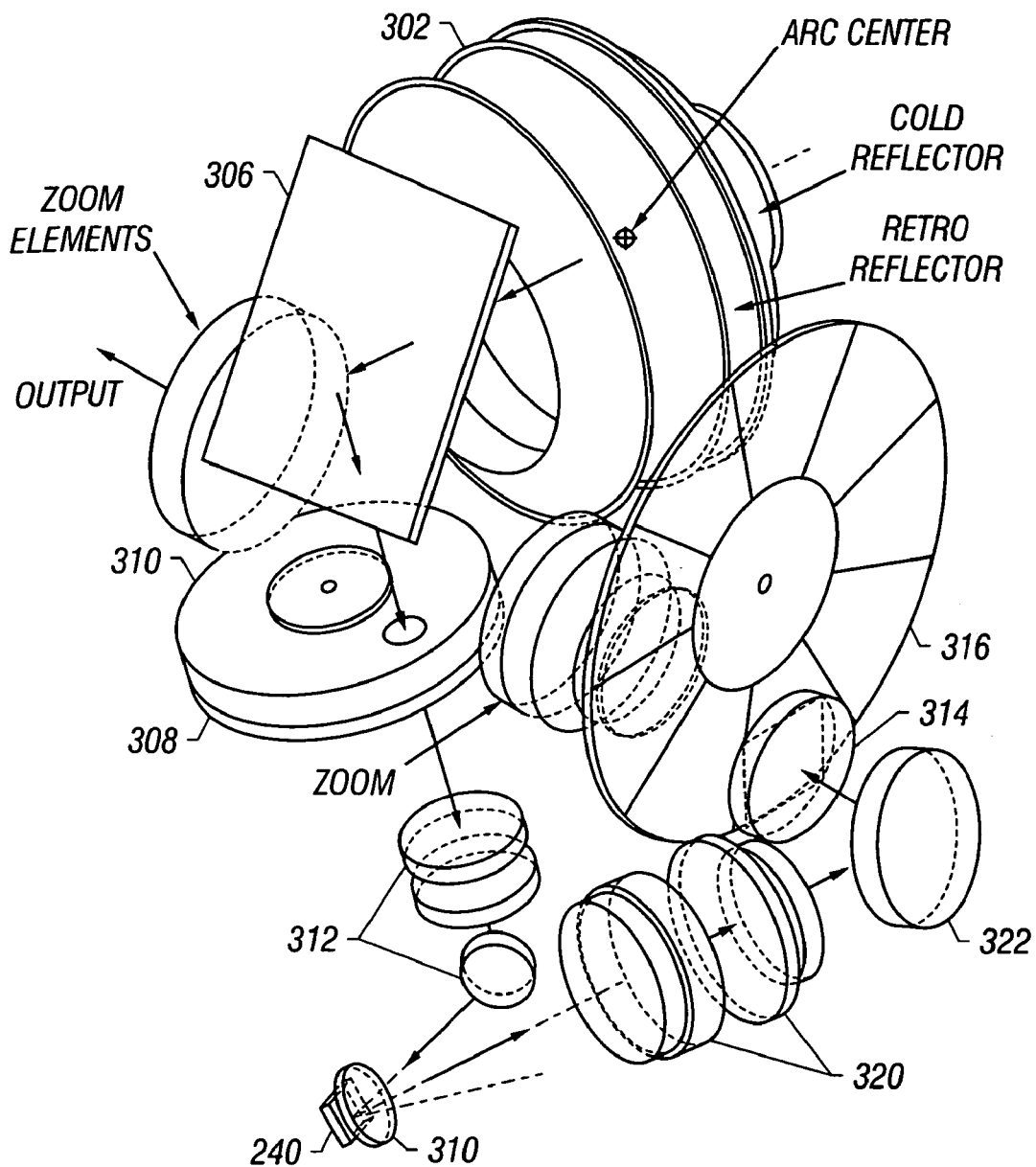
FIG. 3B shows a details of the optical system.

FIG. 3B shows an alternative view of the system optics. Retroreflector assembly 302 is shown with its cold reflector and retroreflectors. The output passes to cold mirror 306 which passes most of the infrared portion of the light, and reflects most of the visible portion.

This first filtered light is then passed to a special color cross fader system 308. The color cross fader used herein preferably is of the type described in U.S. Pat. No. 5,426,576. This device can be used to change the color of the light.

A movable red/green/blue ("RGB") rotating color wheel 310 is also located in series with the color cross fader 308. The pixel by pixel change of the digital mirror can be synchronized by TI's digital mirror driving electronics to the movement of the RGB wheel to form a multi-color image. As described above, the attenuation caused by the color wheel 310 causes an associated amount of light reduction. Therefore, when a monochrome image is being displayed, the inventors recognized that it would be desirable to operate the lighting unit without the associated attenuation caused by the RGB wheel.

The thus filtered and colored light is again reflected by a mirror assembly 312. The assembly can include illumination relay 311 and 313, as shown in FIG. 3B.

The color devices 308 and 310 are between the mirrors 306 and 312. This area is preferably an out-of-focus area, so that the color is homogenized.

The inventors realized that the digital mirror device has an aspect ratio of 1024:1280≈1.2—that is its length and height are not the same.

A third color wheel system 316 is provided at a secondary focused location 314 which forms a second image plane. This third color wheel system is a rotatable color filter with discrete color filters. Those filters can be similar to the type currently used in the ICON™ lighting device. The use of this third color wheel enables the Medusa system to emulate the color operation of the ICON™ system, as well as to allow additional features.

The third color wheel system allows the user to select among 8 discrete filter elements to be placed on the wheel. The designer can choose which, if any, are desired. A split color effect can be obtained by allowing half of each of two filters in the light beam. The wheel can also include glass elements such as frosted glass or prismatic glass.

Three different color wheels are provided optically in series—the color cross fader 308 is located at unfocused location 307 and the ICON™ color wheel 316 is located at focused location 314. Any of the three color altering devices includes a clear location which can be selected, and through which the light will pass unchanged in color. This allows any or all of the color altering devices to be inactive so that light beam color can be selected by one color changes, both color changes or neither color changes.

For example, color cross fader 308 can be set to clear, allowing color altering operation can be done via the ICON™ color wheel 316. This enables lighting programs that were previously written for the ICON™ system to operate the Medusa system without modification.

The light passing the color wheel is slightly out of focus since the focus point is at the color wheel. That light is refracted by a "doublet" lens 318, positioned close to the DMD 240, toward the DMD 240. The light is reflected off of the DMD 240, back through the doublet 318.

The reflected light from the DMD 240 is coupled to a relay lens system 320 which effectively extends the focal length of the system. Another folded cold mirror 322 reflects the light to another relay lens 324. Light is finally output by a programmable zoom projection system 326.

The inventors also realized that improved operation of the DMD for a stage lighting device is obtained when the light is coupled to the DMD with the proper angle of acceptance. The inventors found that the DMD operates best when the light is input with an angle of acceptance limited to around 28°, more preferably with less than 20°.

The operation of this system preferably emulates straight projection optics, with the relay lens forming a 2× multiplier.

Issues with Shadowless Followspot

One important feature of the present invention is its ability to operate as a shadowless followspot. The basic characteristics of this feature are described in our application, U.S. patent application Ser. No. 08/598,077, now U.S. Pat. No. 5,828,485.

The inventors of the present invention have realized, however, a number of issues surrounding accuracy of the shadowless followspot. One important issue, also recognized in the application Ser. No. 08/598,077, is the accuracy that would be obtained by operation with zero parallax.

Figure 3C:
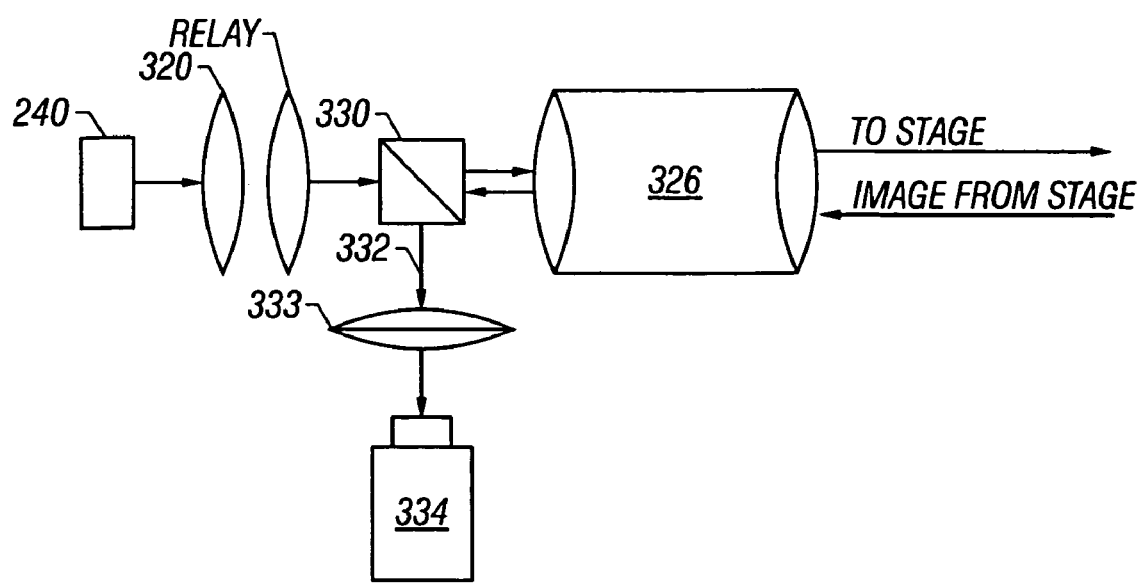
FIG. 3C shows the basic layout of the optical system.

A first embodiment of the minimized parallax system uses the basic layout shown in FIG. 3C. A small prism 330 is placed at an optically insensitive location between the relay lens system 320 and the zoom lens system 326. The prism 330 reflects a portion of the incoming light in a second direction 332. A CCD camera 334 is located in the path of the reflected information to receive that reflected information via focusing lens 333. Proper placement of the prism in this location allows the prism to reflect light that has a same field of view as is projected. After the zoom of the prism allows the CCD camera to receive precisely the information that is in line with the spotlight and including same field of view as the spotlight. This allows that camera to receive precisely what the DMD will project, hence reducing parallax to an almost nonexistent value.

An important part of the processing of the present invention is carried out by the Texas Instruments DMD interface board. This board includes the DMD device and its associated processing structure. The board is laid out and operated using proprietary TI techniques. TI has indicated that vendors should use the board for their controlling operation. The board includes the sensitive DMD mounting as part of the board.

However, the inventors noticed a problem with using this board in a luminaire. Specifically, the inventors found that the relatively large size of the board made it difficult to fit properly at an effective location within the luminaire device. The DMD position would be undesirably dictated by the positioning of the board. The inventors recognized a need to control the DMD from a location remote from the board, so that the optical position of the DMD device is totally separate from the position of the electrical interface board. This allows proper placement of the DMD, taking into account the cooling requirements and optimal angle of illumination.

Figure 16:
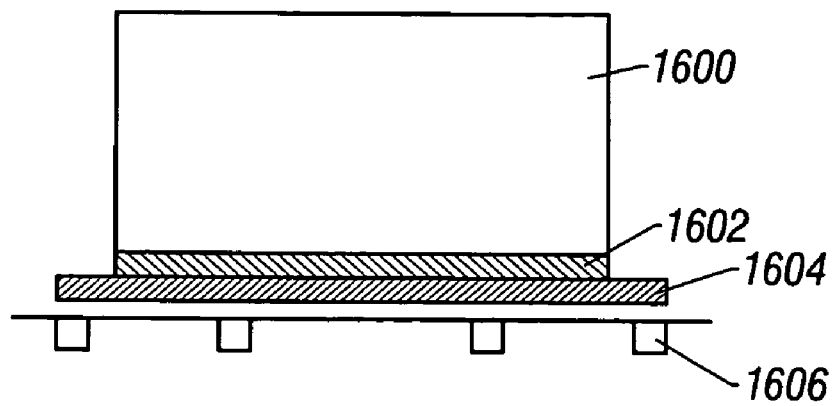
FIG. 16 shows the remoted interface board for the DMD.

According to the present invention, the inventors used a separate interface board for the DMD alone which has the effect of remoting the DMD relative to its interface circuitry. A cross section of this assembly is shown in FIG. 16. The DMD 1600 is shown with bottom electrical contacts 1602. These contacts are usually carefully mated to the corresponding contacs on the ciruit board. However, the system of the present invention uses an elastomeric interface device 1604 to mate between the DMD and a remote card 1600. The inventors found that the use of the elastomeric interface devices facilitates the otherwise difficult DMD mounting.

The overall colorizing system previously described includes three parts. A first part is the color cross fading discs 308. These color cross faders 308 are continuously varying devices. They are best used at a point that is out of focus so that the light can homogenize the color thereof.

The RGB wheel is also used at the out of focus location.

The discrete color wheel 316 is also used as part of the Medusa system. The discrete color wheel 316 includes a plurality of single color filters and is preferably located at a focused point relative to the DMD 240.

One of the important effects capable of being carried out by the ICON™ is the use of two split colors within the beam. The ICON™ color wheel includes a plurality of discrete dichroic filters positioned around a central hub. The interface between the two discrete colors is placed at the center of the light beam in order to obtain this effect. This splits the two colors across the beam and provides a focused split color beam.

Since an important aspect of this new system is the ability to emulate previous generations of luminaires, the use of both in focus and out of focus color wheels enables a maximum number of possible emulations.

The Medusa system includes advanced heat reduction mechanisms to improve the heat handling capability. The production of sufficient light to illuminate the DMD at stage lighting levels, e.g., >5000 lumens, entails an associated production of huge amounts of heat. As described above, a folded cold mirror system is located optically upstream of the DMD to minimize the amount of heat coupled by the light beam towards the digital mirror. An additional cooling aspect of the present invention uses a wall of air concept to separate and thermally isolate various critical elements from other hot portions of the system. The folded optical directs the light beam around or is through the wall of air.

A block diagram of the cooling system is shown in FIG. 8. The lamp and its reflector are the hottest part of the cooling system. Hence most of the heat from the system is in the area generally shown as hot spot 800 in FIG. 8. The output from the lamp is coupled to folded cold mirrors to which pass the heat, instead of coupling that heat toward the other components of the system. However, this still results in a hot spot near the heat producing elements which produce the largest amount of heat.

According to this aspect, a plurality of fans shown as 802, 804 and 806 are mounted in a location that surrounds at least a portion of the periphery of the hot spot. The fans are located and operate to push a wall of relatively cool air into the plane defined by the fans. The wall of air is preferably between the DMD and the heat produced by the hot spot. In addition, although not shown, there may also be a firewall separating the bulb and reflector assembly from other areas to further isolate much of the heat from the hot spot.

Conceptually the wall of air is shown relative to the DMD and lamp in FIG. 9. FIG. 9 represents a view looking from the side portion in FIG. 8. That side portion shows the end on view of the reflector and the light following the curved light path to the DMD. The wall of air 900 between the reflector, representing the hot spot, and the DMD and effectively isolates the heat between the two.

A particularly preferred embodiment uses the folded mirror system to direct the light path around the wall of air thus formed. If the light were passed through the air, the light could be distorted by the heat and the like. The light is formed into a folded path that is directed around the wall to isolate the optical structures from the hot spot.

In addition, the wall of air is conceptually a source of cool air for supplying the rest of the system. Many of the items such as the color wheel shown in FIG. 9 and electronic assemblies, require a source of cool air. In this cooling embodiment, the cool air is obtained by placing a pick off fan shown as 902 into the cool air and sucking off a portion of that cool air from the wall. Pick off fan 902 couples the cool air to the color wheel area that requires it. Accordingly, the wall of cool air forms essentially a ductless shaft, from which cool air can be appropriately supplied to those things that require the cooling.

Accordingly, the wall of cool air forms essentially a ductless shaft of air, from which cool air can be appropriately supplied to those things that require it.

As a general idea, 20–30 cubic feet per minute over 30 square inches will provide the necessary amount of air to maintain the wall.

Motor Control Bus

The motor control bus ("MCB") is formed by an RS 485 multi-drop balanced two wire line driver 250, preferably the SN75176, supplied with 0V and +5V.

Data Format.

Each byte transferred on the MCB includes:
1 Start bit
8 Data bits
1 Intel address bit (1 signifies the byte is an address, 0 that it is not)
2 Stop bits The data rate is preferably 250 kbaud, giving a bit time of 4 μs. A single byte is therefore 48 μs long.

Bus

The TMS320C80 DSP acts as the master, sending a packet to the function drive pcb's every 1 ms. Each transaction has two phases: a master phase, and a supervisor phase. The master phase sets up the address of the function to be communicated. The supervisor phase allows the supervisor to determines status and updates the user parameter RAM.

Data Packet Specification.

The timing diagrams for the data transactions on the MCB are included as FIGS. 13, 14 and 15.

The master first sends the address of the function that needs to communicated. This is followed by a command byte. If the command is a write command, it is followed 4 data bytes that depend on the actual command that is sent. If the command is a read command, the master command the bus into high impedance state, after sending the command to allow the addressed function to reply. This reply shall start being transmitted a maximum of 50 μs from the receipt of the command byte.

The supervisor continually receives all data packets on the bus. The state of an address byte is recognized from the state of the Intel address bit. The supervisor responds by starting a 350 μs timer. The supervisor assumes that the master phase is complete after the 350 μs is over, and this starts the supervisor phase.

The supervisor phase begins by sending a command byte to the addressed function drive PCB. The command byte is followed by 2 data bytes that have a meaning dependent on the actual command byte.

The addressed function drive PCB replies with a status byte, that is followed by 2 data bytes that represent the command byte that is sent.

If the 'c80 master is writing to the addressed function drive pcb the command byte will be followed by up to 4 data bytes, the meaning of which will depend on the particular write command used. If the supervisor has requested the control on one particular function, then the 'c80 master will only transmit the address and null command bytes and leave the bus in a high impedance state to allow the supervisor to send the data part of the packet during the rest of the 1 mS time slot.

b. Read, Recognized by Having Bit 7 Set. (i.e. >=128)

If the 'c80 master is reading from the addressed function drive pcb it will disable the transmitter after sending the command byte to put the bus into a high impedance state to allow the addressed function drive pcb to transmit its reply to the 'c80 master. This reply starts transmitting a maximum of 50 μs from the receipt of the command byte.

The supervisor has an address in the same way as the function drives, and will be addressed by the 'c80 master at the start of one of the 1 ms time slots. The command byte sent by the 'c80 master could be a request for status from the supervisor. In this case the supervisor returns a status byte followed by 2 data bytes. This reply starts being transmitted a maximum of 50 μs from the receipt of the command byte. The data bytes may contain a message to the 'c80 master that the supervisor wishes to obtain control of one or more of the function motors.

The supervisor returns control to the master by sending an appropriate status byte without the Intel address bit being set.

If the supervisor has requested control of a particular function, the master responds with a null command following the address of the function to be controlled, and a command to place the bus into its high impedance state. The supervisor recognizes the high impedance state, and responds with a command and data bytes to control the function. The format of the packet as sent is the same as the one that the master would have sent.

The supervisor sends the supervisor command and 2 data bytes. Total control can be commanded in an analogous way.

The status byte is a bit field with the following flags:

| Bit | Flag | Meaning |
| --- | --- | --- |
| 0 | Range error | Motor is at end of travel and cannot move the requested position |
| 1 | Not ready | During reset of function |
| 2 | Date error | Over-run, framing, address received at wrong time |
| 3 | Data error | Non resetable failure |
| 4 | Over current | Motor winding current too high |
| 5 | o/t motor | Motor too hot |
| 6 | o/t heat/s | Heatsink too hot |

Parameters Stored In RAM

The parameters of the individual function drive pcbs are stored in a non-volatile random access memory in an address space that is "off-chip" so they can be changed by the function DSP controlled via the MCB.

The stored parameters include:

| | |
|---|---|
| Reset mode | (center zero cw or ccw; left or right zero) |
| Reset Sensor | (optical/hall or end stop) |
| Rotation allowed | (continuous or end stops) |
| PCB Serial No. | |
| Assy Serial No. | |
| Address of sub-assy | |
| Software version No. | |
| Steps of available travel | |
| Micro-stepping current profile, or equation of % harmonics | |
| Movement profile | |

Byte Definitions

Address

This includes the address of the function being addressed during the 1 ms time slice, and uses the Intel address bit set to signify that it is an address byte. The addresses are assigned as follows:

| Function Address | Description |
|---|---|
| 00h | Master |
| 01h | Pan |
| 02h | Tilt |
| 03h | RGB in/out |
| 04h | Shutter |
| 05h | Color A (long pass) |
| 06h | Color B (short pass) |
| 07h | Color C (split color/designer) |
| 08h | Zoom |
| 09h | Focus |
| 0Ah–0Eh | Reserved for future options |
| 0fh | Supervisor |
| 10h–FFh | Reserved |

Command

The command byte is either a read byte, which requires the addressed function to reply with the information specified in the command, or a write byte, which allows the transmitting device to transfer some information to the addressed function.

| Value | Command | From | To |
|---|---|---|---|
| *Write Commands (ms bit clear)* | | | |
| 00h | Null | M/S | S/F |
| 01h–0Fh | Motion Profile 1–16 | M/S | F |
| 10h | Following is master status | M | S |
| 11h | Return control to master | S | M |
| 20h | Ignite arc | M | S |
| 25h | Dowse arc | M | S |
| 70h | EEPROM addr and data follows | S | F |
| 71h | RAM addr and data follows | S | F |
| 7Dh | Reset function card | S | F |
| 7Eh | Stop progaram until go | S | F |
| 7Fh | Go, begin code at addr | S | F |
| *Read Commands (ms bit set)* | | | |
| 80 | Null | | |
| 81 | Send last 4 data bytes rx | M/S | F |
| 82 | Send current position | M/S | F |
| 83 | Send supervisor status | | |
| 91 | Send current function status | S | F |
| 92–95h | Send param byte 1–4 | S | F |
| 95 | Send EEPROM data byte | S | F |
| 96 | Send RAM data byte | S | F |
| 97 | Send ROM byte | S | F |

Motor Status

The motor status is returned by a function after it has been addressed by the master and received a command byte from the supervisor.

| Bit | Flag | Meaning |
|---|---|---|
| 0 | Range error | Motor is at end of trave and cannot move to requested position |
| 1 | Not ready | During reset of function |
| 2 | Data error | Over-run, framing, address received time at wrong time |
| 3 | Fatal error | Non resetable failure |
| 4 | Over current | Motor winding current too high |
| 5 | o/t motor | Motor too hot |
| 6 | o/t heat/s | Heatsink too hot |
| 7 | reserved | |

Supervisor Status

The supervisor status is returned by the supervisor after it has been addressed by the master.

| Value | Meaning |
|---|---|
| 00h | Null |
| Fch | Return control of following function to master |
| FDh | Request control of following function |
| FEh | Request control of all functions |
| FFh | Reserved |

Position Data

All position data is preferably 16 bits with the most significant byte being transmitted first.

In cases where the data is derived from an 8 bit user value, the 8 least significant bits ("lsbs") of the 16 bit number will be zero.

Each function drive will have 1 of 4 reset mode parameters stored in the parameter RAM, and the position data sent to the drive is relative to this mode:

| Reset Mode | Meaning of position data |
|---|---|
| center zero cw or ccw | 0000h shall be the center reset position |
| | 7FFFh shall be the maximum position, either cw or ccw |
| | 8000h shall be the minimum position, either ccw or cw |
| left zero | 0000h shall be the left or right position |

-continued

| Reset Mode | Meaning of position data |
|---|---|
| or right zero | |
| | 7FFFh shall be the center position |
| | FFFFh shall be the right or left position |

Timing Data

The most significant byte is transmitted first.

All positive numbers shall be movement times in 1/60 s of a second, giving a time range of between 0 and 9 minutes 6 seconds.

All negative numbers are the 1's complement of movement time in seconds, giving a time range of between 0 and 9 hours and 6 minutes.

For example:

003C is a 1 second move

5B68h is a 6 minute 30 second move

9C4Fh is a 7 hour 5 minute 20 second move

In summary, each message on the motor control bus includes an address of the motor, a command by indicating for example a profile of the operation such as trapezoidal or sinusoidal, and four data bytes including the end position, the time to reach it and the like. The system preferably talks to one piece of information each one millisecond.

Each byte on the motor control bus includes an extra bit. That extra bit indicates whether the address bit is or is not using the Intel protocol. The system used according to this invention is preferably a fail safe type system. A command is sent indicating an address of the motor being controlled. The end of this address starts a timer looking for a value. That timers preferably 350 ms, and the end of that timer indicates that the command signal is over. The process follows the flowchart of command-delay-motor replies with status. The status can include overtemps, motor not ready and data indicative of the motor. Each time the motor is commanded, a command can also be sent to the motor. The master 212 monitors the motor position, since the master 212 calculates other motor positions based on the current motor position. The supervisor 230, on the other hand, only cares about motor status such as overtemp and the like. The supervisor recognizes every address and maintains information indicating every address. If the master address is the supervisor, the rest becomes a message. Importantly, since the supervisor is simple electronics, it can still diagnose faults even once the digital signal processor is no longer capable of operation.

Another operation occurring via the supervisor is asking the DSP 212 for control of a certain slave. The master DSP 212 responds by sending the next response with the address of the motor and a blank following the address. The supervisor 230 recognizes this following blank and sends the whole command which it desires to send. This allows the supervisor to control one of the cards via that port.

The supervisor 230 can also take control of the entire bus 214. This is done by an appropriate command to the master 212, forcing the master to turn off or reach its high impendance state. At that point the supervisor carries out all of the commanding. The motors don't know or care who is doing the commanding, however the supervisor 230 with its limited electronics capability is not capable of carrying out complicated motor control functions.

The information can be downloaded to the multi-parameter lighting fixture in one of different ways. Preferably, a library of gobo images is maintained in some compressed format. The format can be a compressed bitmap such as JPEG image, but more preferably is a vectorized type image indicating a mathematical description or geometrical description such as so called EPS file. The information is used to define the edge of the image that is produced, and can be allowed to ignore everything inside the edge. It can be used for a video source, a shadowless follow spot, a gobo image either standard or custom, external video, still images, effects such as edge sharping, rotation, pointillism, or cross fade between video feeds.

What is claimed is:

1. A ligtiting system, comprising:
a light source, which forms light;
an optical train, which directs said light along an optical path which includes both in focus and out of focus locations;
a first color changing element, allowing a color of the light to be changed at a first in focus location along said optical path; and
a second color changing element, allowing a color of the light to be changed at a first out of focus location along said optical path.

2. A system as in claim 1, wherein one of said color changing element as is a rotating RGB color wheel, which rotates in synchronism with a desired light.

3. The system as in claim 1, wherein one of said color changing element as is a color cross fader.

4. The system as in claim 1, further comprising another color element, which includes discrete color filters.

5. The system as in claim 2, wherein each of said first color changing element and said second color changing element includes clear portions which can be selected to allow light to pass without color is being changed.

6. A lighting system comprising:
a light source, which forms light;
an optical train, which directs said light along an optical path which includes both in focus and out of focus locations;
a first color changing element, allowing a color of the light to be changed at a first in focus location along said optical path;
a second color changing element, allowing a color of the light to be changed at a first out of focus location along said optical path;
wherein one of said color changing elements is an element with discrete color filters.

7. The system as in claim 1, wherein each of said first and second color changing elemens each include controllable motors therein, and further comprising a motor control bus connected to each of said first and second controllable motors.

8. The system as in claim 7, further comprising a controller, enabling control of each of said first and second color changing element over said motor control bus.

9. The device as in claim 8, wherein said controller communicates with said motors, using a command format which includes a command, in a first time slot, followed by data associated with said command, in at least one time slot following said first time slot, and having a specified timing relationship with said first time slot.

10. The device as in claim 7, wherein said motor control bus controls said first and second controllable motors using a time division multiplexed communication in which a function is associated with information associated with the function, at a time related to a time of the function.

11. A lighting system, comprising:
a light source and optical system which forms light, and directs said light along an optical path;
a first light modifying device, including a first motor therein, which is operable based on a position of said motor to change an aspect of said light;
a second light modifying device, separate from said first light modifying device, and including a second motor therein, which is operable based on a position of said second motor, to change a different aspect of said light than said first aspect; and
a motor control bus, connected to said first and second motors, and communicating information associated with said first and second motors, where a significance of said information being dependent on a time slot on said motor control bus.

12. A system as in claim 11, further comprising a processor which communicates over said motor control bus with said first and second motors.

13. A system as in claim 12, wherein said processor communicates by a format having a function in a specified form followed by data associated with the command, in specified time slots.

14. A system as in claim 12, wherein said processor communicates commands to said first and second motors.

15. A system as in claim 14, wherein said processor also receives data from said first and second motors.

16. A system as in claim 11, wherein said first light modifying device is a color changer, and said second light modifying device is a controllable optical element.

17. A system as in claim 16, wherein said controllable optical element is an optical zoom part.

18. A system as in claim 11, wherein said first light modifying device is a color changer, and said second light modifying device is a can and tilt mechanism for the direction of light projection.

19. A system as in claim 11, wherein said motor control bus communicates addressed information which is addressed to one of the items on said bus, and also includes a function command associated with said address.

20. A system as in claim 19, wherein said function command includes data associated with the command.

21. A system as in claim 19, wherein said command is a command to move the motor, and said data represents a position to which the motor should be moved.

22. A system as in claim 21, wherein said data further represents a time of motor movement.

23. A system as in claim 21, wherein said data further represents a time range during which the motor should be moved.

24. A system as in claim 21, wherein said data further represents a profile of movement of motor operation.

25. A system as in claim 12, wherein one of said commands allows the processor to directly control one of said first and second motors.

26. A system as in claim 11, wherein said optical system includes a digital light shaping device which allows digitally controlling shapes of light which pass along the optical path.

27. A method, comprising:
forming a beam of light;
directing said beam of light along an optical path;
first modifying said beam of light using a motor controlled device to make a first modification to said beam of light;
second modifying said beam of light using a second motor controlled device to make a second modification to said beam of light that is different than said first modification; and
controlling said first modifying and said second modifying over a motor control bus, in a format that allows sending a first part indicative of a function, and a second part indicative of data associated with said function, where said second part has a specified time slot relationship with said first part.

28. A method as in claim 27, further comprising using a common controller to communicate over said motor control bus and to control said first modifying and said second modifying.

29. A method as in claim 27, wherein said first modifying comprises changing a color of the light.

30. A method as in claim 27, wherein said first modifying comprises changing an optical characteristic of the light.

31. A method as in claim 30, wherein said changing an optical characteristic comprises changing a characteristic of an optical zoom.

32. A method as in claim 27, wherein said first modifying comprises changing a position of projection of the light.

33. A method as in claim 32, wherein said changing positioning comprises controlling pan and tilt motors.

34. A method as in claim 29, wherein said second modifying comprises changing a characteristic of an optical function of the light.

35. A method as in claim 29, wherein said second modifying comprises changing the position of projection of the light.

36. A method as in claim 27, wherein said controlling comprises sending a function, and sending data associated with the function.

37. A method as in claim 36, wherein said function comprises a control to move a motor within one of the motor controlled devices, and said data comprises a position to which the motor should be moved.

38. A method as in claim 37, wherein said controlling further comprises sending data representing a time profile of the motor operation.

39. A method as in claim 27 further comprising, along said optical path, digitally controlling a shape of the light.

40. A lighting system, comprising:
means for forming light along an optical path;
a first light modifying means for controlling a first aspect of said light, said first light modifying means including a first motor means for moving a position based on an applied command;
a second light modifying means for controlling a second aspect of said light, said second light modifying means including a second motor means for moving a position based on an applied command;
a motor control bus means for communicating said applied commands to both of said first and second light modifying means;
wherein said motor control bus means is also for operating in a time division multiplexed format.

41. A system as in claim 40, wherein said time division multiplexed format is one where a command defines a time period associated with the command, during which time period data associated with the command is provided.

42. A system as in claim 40, further comprising a third light modifying means, for controlling a third aspect of said light, also connected to said motor control bus.

43. A system as in claim 40, wherein one of said light modifying means is an electrically controllable color changer.

44. A system as in claim 40, wherein one of said light modifying means is an electronically controllable optical characteristic mechanism.

45. A system as in claim 40, wherein one of said light modifying means includes means for controlling a location of an output beam.

46. A system as in claim 40, further comprising means, along said optical path, for digitally controlling a shape of light which passes.

* * * * *